US012744318B2

(12) United States Patent
Luo et al.

(10) Patent No.: US 12,744,318 B2
(45) Date of Patent: Sep. 22, 2026

(54) ANTENNA SWITCHING METHOD AND TERMINAL ANTENNA

(71) Applicant: Honor Device Co., Ltd., Shenzhen (CN)

(72) Inventors: Jian Luo, Shenzhen (CN); Qiang Huo, Shenzhen (CN); Kaiming Dong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 267 days.

(21) Appl. No.: 18/559,956

(22) PCT Filed: Apr. 26, 2023

(86) PCT No.: PCT/CN2023/091003
§ 371 (c)(1),
(2) Date: Nov. 9, 2023

(87) PCT Pub. No.: WO2024/016771
PCT Pub. Date: Jan. 25, 2024

(65) Prior Publication Data

US 2025/0087884 A1 Mar. 13, 2025

(30) Foreign Application Priority Data

Jul. 19, 2022 (CN) ......................... 202210848342.3

(51) Int. Cl.
*H01Q 5/328* (2015.01)
*H01Q 15/24* (2006.01)

(52) U.S. Cl.
CPC ........... *H01Q 5/328* (2015.01); *H01Q 15/244* (2013.01)

(58) Field of Classification Search
CPC ............................. H01Q 5/328; H01Q 15/244
See application file for complete search history.

(56) References Cited

U.S. PATENT DOCUMENTS 11,283,154 B2 3/2022 Wen et al.
2005/0225451 A1* 10/2005 Inui ......................... G01S 13/74 342/147

(Continued)

FOREIGN PATENT DOCUMENTS

CN 106229679 A 12/2016
CN 107925156 A 4/2018

(Continued)

OTHER PUBLICATIONS

Yang Danping, "Multi-polarization reconfigurable antenna design", Nanjing University of Information Science and Technology, Jan. 15, 2022, 70 pages.

*Primary Examiner* — David Bilodeau
(74) *Attorney, Agent, or Firm* — Slater Matsil, LLP

(57) ABSTRACT

An antenna switching method and a terminal antenna are disclosed, and relate to the field of antenna technologies. A specific solution involves: receiving, by the electronic device, a target signal with a target polarization characteristic, controlling the terminal antenna to operate in a first state when an attitude of the electronic device is the first attitude, where the terminal antenna in the first state has a first polarization characteristic, and the first polarization characteristic corresponds to a target polarization characteristic of a target signal received in the first attitude; and controlling the terminal antenna to operate in a second state when the attitude of the electronic device is the second attitude, where the terminal antenna in the second state has a second polarization characteristic, and the second polarization characteristic corresponds to a target polarization characteristic of a target signal received in the second attitude.

19 Claims, 20 Drawing Sheets

(56) References Cited

U.S. PATENT DOCUMENTS

| | | | |
|---|---|---|---|
| 2008/0136721 A1 | 6/2008 | Parsche et al. | |
| 2009/0009417 A1 | 1/2009 | Matsushita et al. | |
| 2010/0109960 A1* | 5/2010 | Guler | H01Q 15/244 343/756 |
| 2011/0215978 A1 | 9/2011 | Lindenmeier et al. | |
| 2022/0026858 A1* | 1/2022 | Fujisawa | H01Q 1/24 |
| 2023/0231311 A1* | 7/2023 | Zhao | G04R 60/00 343/702 |

FOREIGN PATENT DOCUMENTS

| | | | | |
|---|---|---|---|---|
| CN | 110492918 A | | 11/2019 | |
| CN | 112332080 A | | 2/2021 | |
| CN | 212542678 U | | 2/2021 | |
| CN | 113067129 A | | 7/2021 | |
| CN | 113258252 A | | 8/2021 | |
| CN | 113471700 A | * | 10/2021 | H04B 1/40 |
| CN | 113629408 A | | 11/2021 | |
| CN | 113676238 A | | 11/2021 | |
| CN | 216056988 U | | 3/2022 | |
| CN | 115084867 A | | 9/2022 | |
| JP | H11266120 A | | 9/1999 | |
| JP | 2000077934 A | | 3/2000 | |
| WO | 2022068583 A1 | | 4/2022 | |

* cited by examiner

ANTENNA SWITCHING METHOD AND TERMINAL ANTENNA

CROSS-REFERENCE TO RELATED APPLICATIONS

This application is a national stage of International Application No. PCT/CN2023/091003, filed on Apr. 26, 2023, which claims priority to Chinese Patent Application No. 202210848342.3, filed on Jul. 19, 2022, both of which are incorporated herein by references in their entireties.

TECHNICAL FIELD

This application relates to the field of antenna technologies, and in particular, to an antenna switching method and a terminal antenna.

BACKGROUND

In different usage scenarios, a smartwatch needs to transmit and receive electromagnetic waves with different polarization characteristics. Otherwise, quality of antenna reception may be affected. This also requires an antenna of the smartwatch to be capable of providing corresponding polarization characteristics in different scenarios, so as to improve quality of signal transmission and reception in the corresponding scenarios.

SUMMARY

Embodiments of this application provide an antenna switching method and a terminal antenna, in which an antenna capable of providing different polarization characteristics is applicable to an electronic device (such as a wearable device), and according to attitudes of the wearable device, the antenna is switched to operate in different operating states to provide corresponding polarization characteristics. Therefore, in different attitudes, the antenna provides corresponding polarization characteristics, and performs signal transmission and reception in the corresponding attitudes.

To achieve the foregoing objective, the following technical solutions are used in the embodiments of this application:

In a first aspect, an antenna switching method applied to an electronic device is provided. A direction a display screen points to includes a first direction and a second direction when the electronic device is in use. The electronic device corresponds to a first attitude when the display screen points to the first direction, and the electronic device corresponds to a second attitude when the display screen points to the second direction. The electronic device is provided with a terminal antenna. The method includes: receiving, by the electronic device, a target signal with a target polarization characteristic, controlling the terminal antenna to operate in a first state when an attitude of the electronic device is the first attitude, where the terminal antenna in the first state has a first polarization characteristic, and the first polarization characteristic corresponds to a target polarization characteristic of a target signal received in the first attitude; and controlling the terminal antenna to operate in a second state when the attitude of the electronic device is the second attitude, where the terminal antenna in the second state has a second polarization characteristic, and the second polarization characteristic corresponds to a target polarization characteristic of a target signal received in the second attitude.

In this way, in this application, the antenna in the electronic device can provide at least two different polarization characteristics in different operating states. Correspondingly, different polarization characteristics can be provided in different attitudes based on the antenna switching method. It may be understood that, when the electronic device (such as a smartwatch in a wearable device) is in different attitudes, attitudes of the antenna disposed therein are also different. Then, polarization characteristics are also different relative to target signals from the sky (such as positioning signals). Based on this solution, the polarization characteristics may be adjusted accordingly according to the attitudes, so that, regardless of the attitude of the electronic device, the antenna therein can provide the corresponding polarization characteristics to receive the target signals.

Optionally, the electronic device is provided with an attitude input module, and the method further includes: acquiring, by the electronic device, attitude information through the attitude input module; and determining the attitude of the electronic device as the first attitude according to the attitude information.

Optionally, the attitude input module includes an acceleration sensor and/or a gyroscope sensor. The attitude information includes a current angular velocity of the electronic device when the attitude input module includes the acceleration sensor. The attitude information includes current displacement of the electronic device in each axial direction when the attitude input module includes the gyroscope sensor. In this way, a current attitude of the electronic device can be determined by acquiring corresponding sensor information through the sensor disposed in the electronic device.

Optionally, before the controlling the terminal antenna to operate in a first state, the method further includes: determining first control information corresponding to the first attitude, where the first control information is used for controlling the terminal antenna to operate in the first state. To realize adjustment of the operating state of the antenna relative to the attitude, control information of the antenna can be determined through the attitude, so as to adjust the antenna to operate in the operating state corresponding to the attitude and provide the corresponding polarization characteristic.

Optionally, an attitude-polarization truth table is configured in the electronic device, where the attitude-polarization truth table includes control information corresponding to different attitudes. The determining first control information corresponding to the first attitude includes: querying, according to the first attitude, the attitude-polarization truth table to acquire the corresponding first control information. In this way, the corresponding control information can be determined according to the attitude through a preset correspondence.

Optionally, the target signal is a positioning signal from a satellite. The first state corresponds to that the display screen of the electronic device points to a direction near the sky, and the first polarization characteristic is a right-handed circular polarization characteristic or a right-handed elliptical polarization characteristic. In this way, the electronic device is a smartwatch for example. When a watch face (i.e., the display screen) points to a direction near the sky, the antenna can be controlled to provide the right-handed circular polarization or right-handed elliptical polarization characteristic to realize effective reception of a positioning signal (a right-handed circular polarization signal).

Optionally, the method further includes: controlling the terminal antenna to operate in a second state when the attitude of the electronic device is the second attitude, where the terminal antenna in the second state has a second polarization characteristic, and the second polarization characteristic corresponds to a polarization characteristic of the target signal received in the second attitude. The second attitude is different from the first attitude. In this way, when the attitude of the electronic device changes, the antenna may also adjust the operating state accordingly to provide a polarization characteristic corresponding to the current attitude.

Optionally, the target signal is a positioning signal from a satellite. The second state corresponds to that the display screen of the electronic device points to a direction near a horizontal plane, and the second polarization characteristic is a linear polarization characteristic.

Optionally, the method further includes: controlling the terminal antenna to operate in a third state when the attitude of the electronic device is the third attitude, where the terminal antenna in the third state has a third polarization characteristic, and the third polarization characteristic corresponds to a polarization characteristic of the target signal received in the third attitude. The third attitude is different from the first attitude or the second attitude.

Optionally, the target signal is a positioning signal from a satellite. The third state corresponds to that the display screen of the electronic device points to a direction near the ground, and the third polarization characteristic is a left-handed circular polarization characteristic or a left-handed elliptical polarization characteristic. In this example, when the watch face points to the ground, the antenna may provide the left-handed polarization characteristic, causing the electronic device to show a right-handed polarization characteristic when pointing to the sky, so as to realize effective reception of a positioning signal from the sky.

Optionally, after the controlling the terminal antenna to operate in a first state, the method further includes: determining whether signal strength of a target signal received by the terminal antenna is greater than a preset threshold, and controlling, when the signal strength is greater than the preset threshold, the terminal antenna to no longer adjust the operating state. In this way, the judgment manner based on the preset threshold can ensure that the antenna can operate in a better state and perform accurate signal reception.

Optionally, when the signal strength is less than the preset threshold, the method further includes: controlling the terminal antenna to operate in a fourth state, where the fourth state is different from the first state; and determining whether signal strength of the target signal received by the terminal antenna is greater than the preset threshold, and controlling, when the signal strength is greater than the preset threshold, the terminal antenna to no longer adjust the operating state. In this way, when a current operating state determined according to the attitude cannot provide better signal transmission and reception capabilities, another operating state may be tried, and a better operating state can be switched to for signal transmission and reception.

Optionally, when signal strength of corresponding target signals respectively received by the terminal antenna switched to different operating states is less than the preset threshold, the method further includes: controlling the terminal antenna to operate in a fifth state, the signal strength of the target signal received in the fifth state being greater than the signal strength of the target signals received in other operating states. In this way, in some scenarios, when signal reception in all operating states is not ideal, the best one of all the operating states may be used for signal transmission and reception, so as to improve the signal transmission and reception capabilities of the electronic device as much as possible.

In a second aspect, a terminal antenna is provided. The terminal antenna is applied to the antenna switching method as described above. The terminal antenna includes: a first radiator, where the first radiator is a closed ring structure. The first radiator includes at least three electrical connection points. An operating state of the terminal antenna includes a first state and a second state, and a polarization characteristic in the first state is different from that in the second state. For example, the terminal antenna in the first state has a first polarization characteristic, and the terminal antenna in the second state has a second polarization characteristic. This example provides an example of the terminal antenna. The terminal antenna can provide different polarization characteristics in different operating states. Therefore, with reference to the antenna switching method provided in the first aspect, the antenna can be adjusted according to a current attitude to select a suitable operating state for better signal transmission and reception.

Optionally, the at least three electrical connection points include a feed point and at least two ground points. The at least two ground points are provided, so that, when a same mode is excited, currents can be grounded respectively through the two ground points, thereby acquiring different current distributions in the same mode and acquiring two different resonances. Therefore, based on a relationship between different relative frequency-domain positions of the two resonances, the antenna can provide different polarization characteristics.

Optionally, the at least two ground points include a first ground point and a second ground point, and a tuning component is arranged between the first ground point and a reference ground, where the tuning component includes at least two different on/off states. The terminal antenna operates in the first state when the tuning component operates in a first on/off state. The terminal antenna operates in the second state when the tuning component operates in a second on/off state. The first on/off state and the second on/off state are included in the at least two different on/off states. In this way, the on/off state of the tuning component is adjusted, so that a frequency position relationship of the above two resonances varies in different on/off states. Therefore, different polarization characteristics are provided.

Optionally, the at least three electrical connection points include a first electrical connection point, a second electrical connection point, and a third electrical connection point, and an angle between the first electrical connection point and the second electrical connection point relative to a geometric center of the first radiator is within a range of 45+/−15 degrees. An angle between the second electrical connection point and the third electrical connection point relative to the geometric center of the first radiator is within a range of 90+/−15 degrees. Therefore, at a same moment, two vertical or nearly vertical currents may be distributed on an antenna radiator, so that a better circular polarization characteristic distribution is shown at this moment.

Optionally, a first resonance and a second resonance are excited when the terminal antenna operates, and an equivalent current direction corresponding to the first resonance on the first radiator is perpendicular to an equivalent current direction corresponding to the second resonance on the first radiator. The equivalent current direction corresponding to the first resonance is close to a horizontal direction, and the equivalent current direction corresponding to the second resonance is close to a vertical direction. Therefore, a relationship between the two resonances is clarified. It may be understood that, when the current distributions corresponding to the two resonances at the same moment are orthogonal, polarization characteristics generated are closer to circular polarization.

Optionally, when the operating state of the terminal antenna is the first state, the first resonance and the second resonance jointly cover an operating frequency band of the terminal antenna, and the first resonance is lower than the second resonance. When the operating state of the terminal antenna is the second state, the first resonance and the second resonance jointly cover the operating frequency band of the terminal antenna, and the first resonance is higher than the second resonance.

Optionally, the operating state of the terminal antenna further includes a third state, and when the operating state of the terminal antenna is the third state, the first resonance or the second resonance covers the operating frequency band of the terminal antenna.

Optionally, in the first state, the terminal antenna has a right-handed circular polarization or right-handed elliptical polarization characteristic. In the second state, the terminal antenna has a left-handed circular polarization or left-handed elliptical polarization characteristic. In the third state, the terminal antenna has a linear polarization characteristic. In this way, when one resonance is adjusted outside the operating frequency band and only one resonance is used to cover the operating frequency band, the antenna can provide the linear polarization characteristic.

Optionally, an electrical length of the first radiator corresponds to 1 times a wavelength of the operating frequency band, and both the first resonance and the second resonance are resonances corresponding to a 2/2 wavelength mode.

In a third aspect, an electronic device is provided. The electronic device is provided with the terminal antenna provided in the second aspect and any options thereof. The electronic device performs the antenna switching method provided in the first aspect and any options thereof during operation. Exemplarily, the electronic device may be a smartwatch. The smartwatch may have a positioning function. For example, the smartwatch may communicate with a satellite and receive a positioning signal to realize positioning.

It is to be understood that the technical features of the technical solution provided in the third aspect above can all correspond to the technical solution provided in the first/second aspect and possible designs thereof, so the similar beneficial effects can be achieved. Details are not described herein again.

DETAILED DESCRIPTION OF THE EMBODIMENTS

Figure 1:
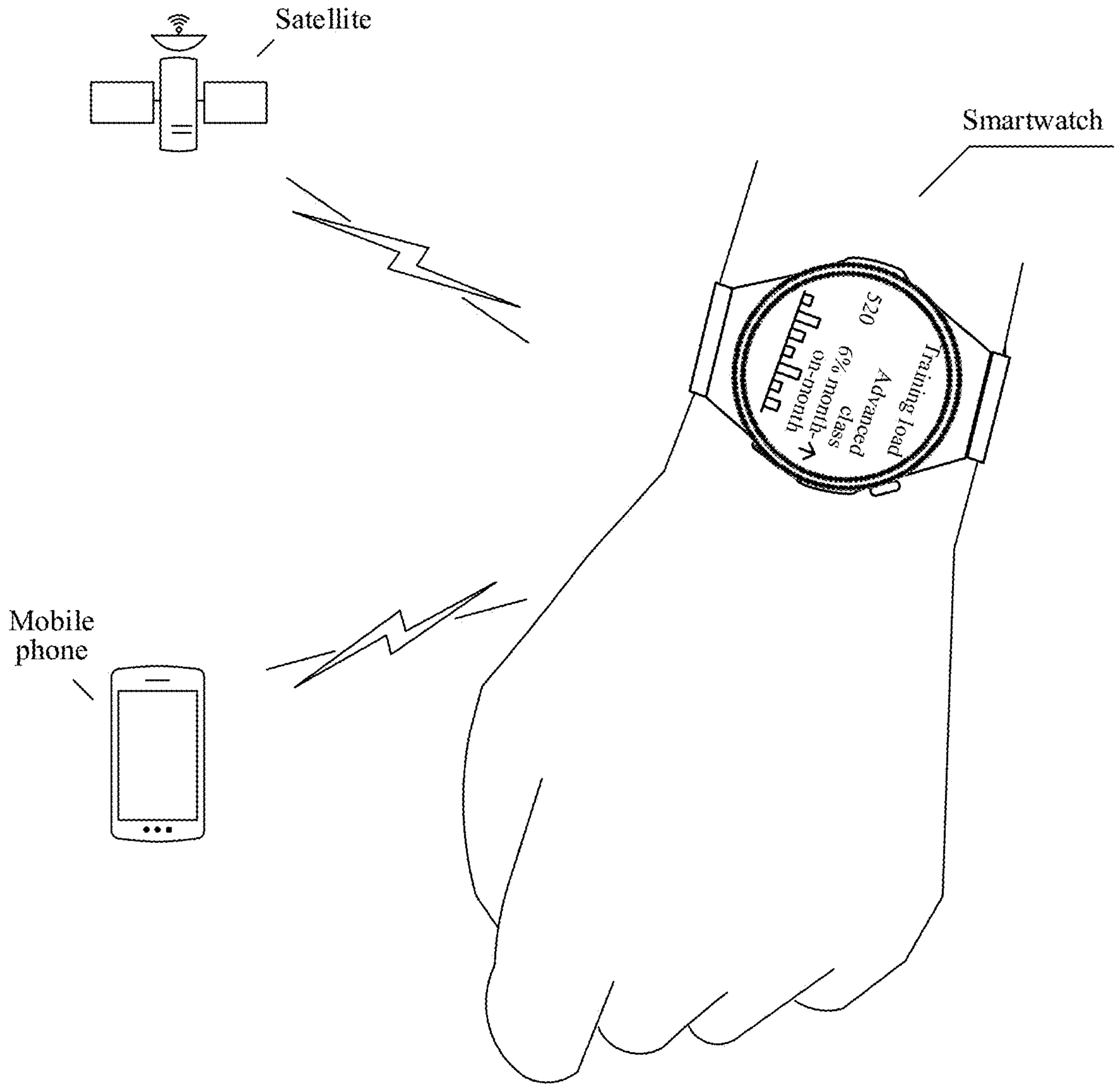
FIG. 1 is a schematic diagram of a communication scenario of a smartwatch.

At present, a smart wearable device has been widely used. For example, the smart wearable device is a smartwatch. The smartwatch may be worn on a forearm (such as a wrist) of a user to provide the user with smart experience. Exemplarily, referring to FIG. 1, in some scenarios, the smartwatch may provide the user with a positioning function. For example, the smartwatch may communicate wirelessly with a positioning device such as a satellite to acquire current positioning information. In some other scenarios, the smartwatch may also monitor physical information of the user, for example, a heart rate and other physical information of the user during exercise. The smartwatch may communicate wirelessly with another electronic device (such as a mobile phone) and send the acquired physical information to the mobile phone to realize data sharing. In some other scenarios, the smartwatch may also provide voice calls and data connection functions. For example, the voice calls may be voice calls based on networks such as GSM, WCDMA, VOLTE, TDSCDMA, CDMA, and VONR, and the data connection functions may be data connections based on networks such as WCDMA, TDSCDMA, CDMA, LTE, 5G NR, Bluetooth, and WIFI (such as 2.4G WIFI and 5G WIFI). In some other scenarios, the smartwatch may also have a positioning function. For example, a UWB antenna may be disposed in the smartwatch to realize positioning of other electronic devices and the like.

An antenna may be disposed in the smart wearable device, so as to realize the wireless communication function in the above example. Due to a limited size of the smart wearable device, a space that can be provided for the antenna is correspondingly small. Then, in some designs, the antenna may be miniaturized by reusing a metal structure in the smart wearable device.

Exemplarily, the smartwatch is still taken as an example. The smartwatch may include a plurality of components that can provide rigid support, for example, a bezel made of a metal material, and a watch bottom made of a non-metal material such as plastics or ceramics. The bezel may provide support for the smartwatch in all directions. In some implementations, when the bezel is made of the metal material, the bezel may also be used as an antenna radiator to realize structural reuse. The watch bottom may provide bottom support for the smartwatch. At least one printed circuit board (Printed Circuit Board, PCB) and/or flexible printed circuit (Flexible Printed Circuit, FPC) may also be disposed on the watch bottom. In this application, the at least one PCB and/or FPC may be configured to carry components inside the smartwatch, for example, electronic components such as a communication chip, a radio frequency device, a power amplifier, and a filter device. To enable the electronic components to normally operate, a reference ground may also be disposed on the at least one PCB and/or FPC. The reference ground may provide a zero-potential reference for the electronic components. In some implementations, the reference ground may implement a reference ground function by laying metal materials (such as copper) in the at least one PCB and/or FPC. For ease of description, in the following description, the reference ground formed by the at least one PCB and/or FPC is collectively referred to as a floor for illustration.

Figure 2:
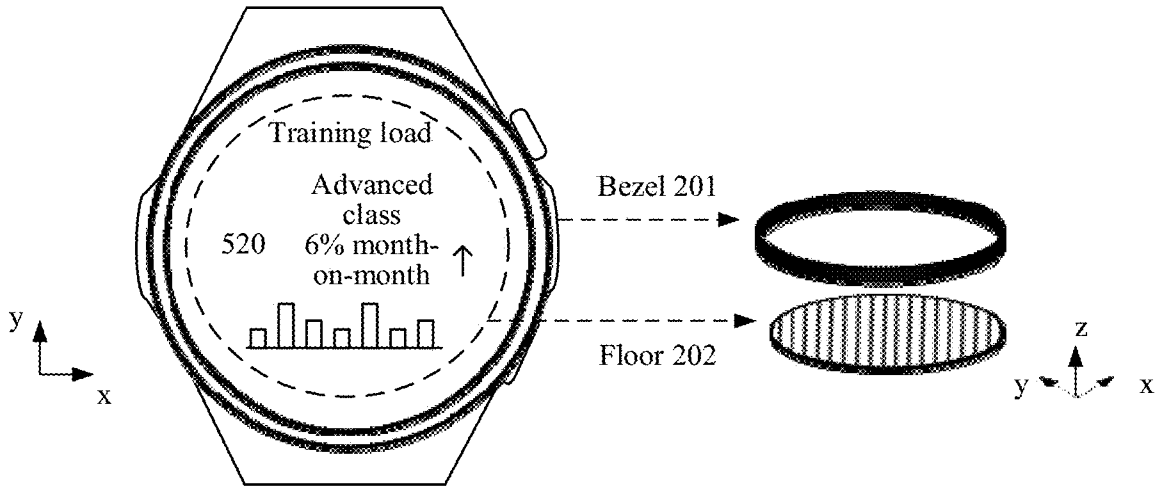
FIG. 2 is a schematic diagram of antenna arrangement of a smartwatch.

Referring to FIG. 2, a bezel 201 and a floor 202 may be disposed in the smartwatch. Both the bezel 201 and the floor 202 may be metal structures. Then, the antenna may be disposed in the smartwatch by using metal conductive characteristics of the bezel 201 and the floor 202.

The bezel 201 may serve as an antenna radiator for radiation. The floor 202 may serve as a reference ground of the antenna. In this way, when the antenna operates, radiation of the antenna is realized by exciting currents on the bezel 201 and the floor 202.

Exemplarily, in an example, the antenna is disposed in the smartwatch to implement a satellite positioning function.

During satellite positioning, a positioning satellite may send a positioning signal. When the antenna in the smartwatch receives positioning signals from a plurality of positioning satellites at different positions, a current position can be determined according to the plurality of different positioning signals to implement the satellite positioning function.

Figure 3:
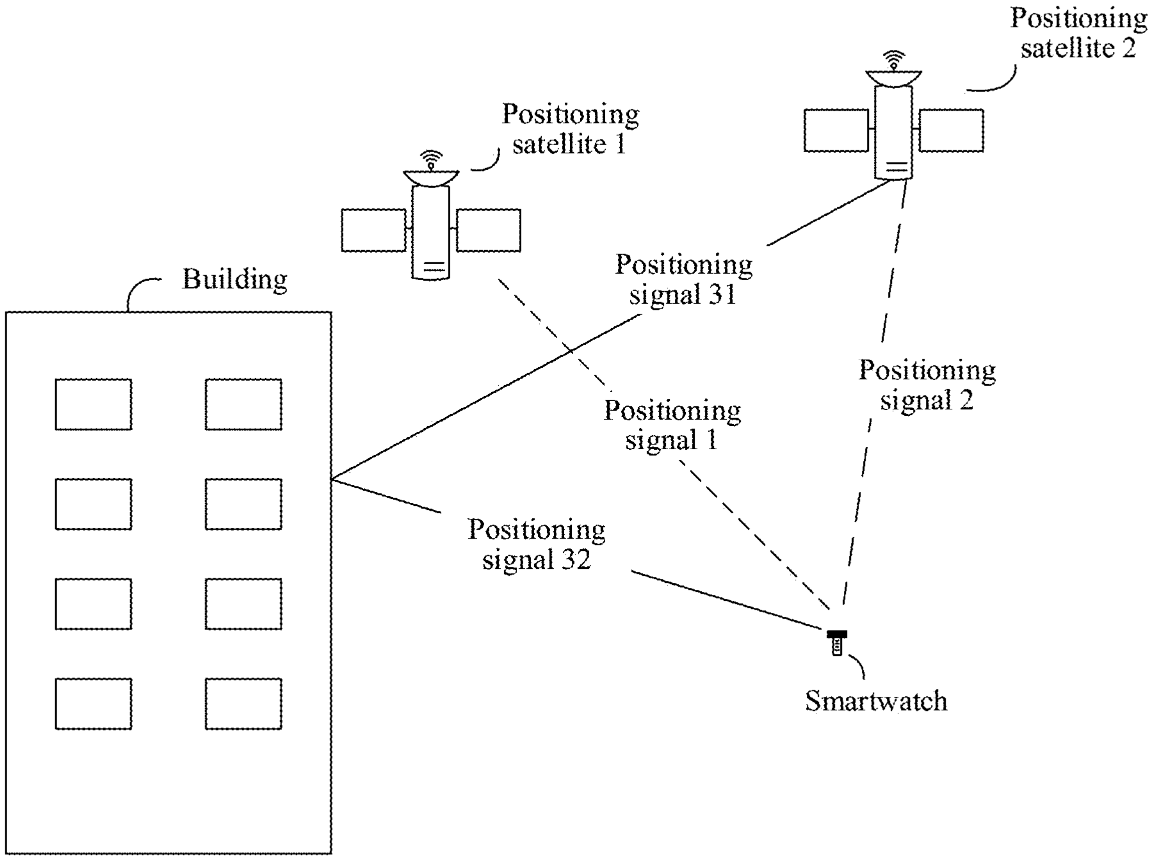
FIG. 3 is a schematic diagram of a positioning scenario of a smartwatch.

As shown in FIG. 3, the antenna in the smartwatch may receive a positioning signal 1 from a positioning satellite 1 and a positioning signal 2 from a positioning satellite 2. In this scenario, the positioning signal sent by the positioning satellite 2 may also include a positioning signal 31. The positioning signal 31 may not be directly received by the antenna in the smartwatch. The positioning signal 31 may be reflected by a building near the smartwatch to form a positioning signal 32 and then be received by the antenna in the smartwatch. Then, the smartwatch may determine current position information according to the positioning signal 1, the positioning signal 2, and the positioning signal 32. It is to be noted that the positioning signal 32 is formed after the positioning signal 31 is reflected. For the smartwatch, the positioning signal 1 and the positioning signal 2 may be effective positioning signals. Since the positioning signal 32 is not a signal directly sent by the positioning satellite, the positioning signal 32 may be an ineffective positioning signal during the positioning, that is, an interference signal.

Figure 4:
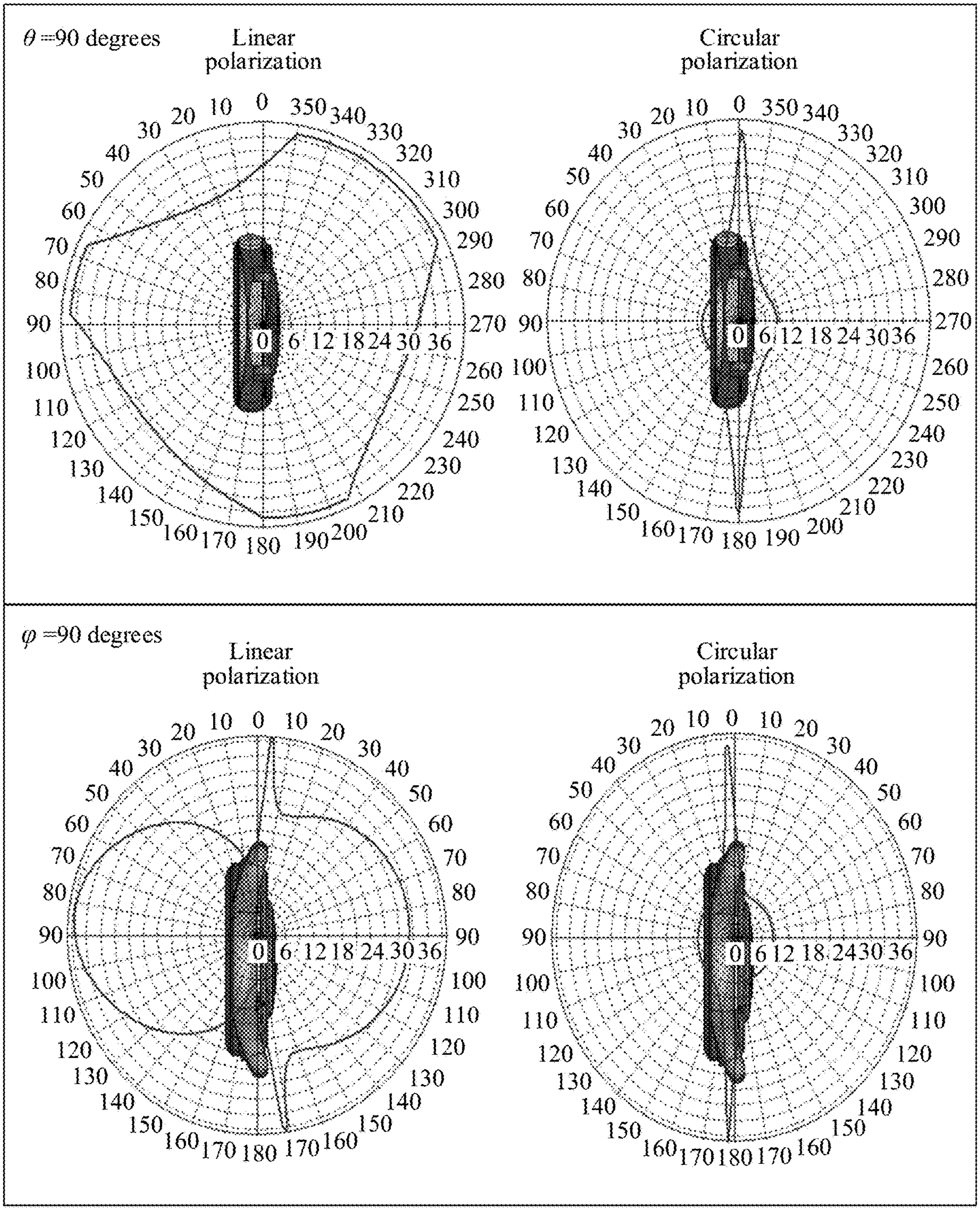
FIG. 4 is a schematic diagram of axial ratios of antennas with different polarization characteristics.

It is to be understood that different antennas may have different polarization characteristics. For example, the antennas may be classified into linearly polarized antennas, circularly polarized antennas, and the like according to the different polarization characteristics of the antennas. The circularly polarized antennas may be further classified into left-handed and right-handed antennas according to different polarization directions. For example, the circularly polarized antennas may include a left-handed circularly polarized antenna and a right-handed circularly polarized antenna. The linearly polarized antennas may have relatively uniform polarization characteristics in all directions. That is, the linearly polarized antennas may exhibit linear polarization characteristics in all directions. In contrast, the left-handed circularly polarized or right-handed circularly polarized antenna can only exhibit a specific circular polarization characteristic in some directions. That is, generally, the directions cannot exhibit a uniform circular polarization characteristic. Exemplarily, description is based on a directional diagram. Refer to FIG. 4 which is a schematic diagram of comparison between axial ratios of a linearly polarized antenna and a right-handed circularly polarized antenna. In FIG. 4, directional diagrams of different sections in polar coordinates are shown for comparison. As shown in FIG. 4, in the case of θ=90 degrees, the linearly polarized antenna has a higher axial ratio in all directions in space. For example, as shown in FIG. 4, in this case, the axial ratios of the linearly polarized antenna in all directions are greater than 10 dB. In other words, the linearly polarized antenna has a linear polarization characteristic in all spatial directions. In contrast, the right-handed circularly polarized antenna is only between 220 degrees to 320 degrees and 40 degrees to 140 degrees, showing an elliptical polarization characteristic close to a circular polarization characteristic. In addition, the polarization characteristic between 220 degrees to 320 degrees is opposite to the polarization characteristic between 40 degrees to 140 degrees. A corresponding direction of a watch face between 220 degrees and 320 degrees is taken as an example. Then, right-handed elliptical polarization may be shown in a direction of the watch face, and correspondingly, left-handed elliptical polarization may be shown in a direction of the watch bottom. Outside the above range, linear polarization may be shown. Similarly, in the case of φ=90 degrees, the axial ratios of the linearly polarized antenna are all high at all angles in space, which corresponds to the linear polarization characteristic. Accordingly, a range of the circular polarization characteristic (or elliptical polarization characteristic) of the right-handed circularly polarized antenna in space is also limited.

It is to be noted that the solution as referred to in the embodiments of this application is applicable to a wearable device. Generally, the wearable device may include a display screen. The display screen may be configured to provide the user with a display function. For example, when the wearable device is a smartwatch, the watch face in the foregoing example is a watch face displayed on the display screen of the smartwatch. Then, a direction the watch face points to is a direction from the display screen to an outer side of the smartwatch. That is, the direction the watch face points to is a direction the display screen points to.

Generally, when a structure of the antenna and an electrical connection circuit are fixed, the polarization characteristic of the antenna may no longer change. During signal transmission and reception, when a polarization characteristic of a transmitting antenna match a polarization characteristic of a receiving antenna, the receiving antenna can better receive an electromagnetic wave emitted by the transmitting antenna, thereby acquiring better communication quality.

The antenna disposed in the smartwatch may also include a linearly polarized antenna and a circularly polarized antenna. Since the antenna on the positioning satellite has a right-handed circular polarization characteristic, the circularly polarized antenna in the smartwatch may be a right-handed circularly polarized antenna, so as to better receive the positioning signals. It is to be noted that, during a specific implementation, it is difficult to achieve standard right-handed circular polarization with an axial ratio less than 3 dB in a smartwatch environment. Since a right-handed elliptically polarized antenna with an axis ratio less than 6 dB can also better receive right-handed circularly polarized signals (such as positioning signals), the right-handed elliptically polarized antenna may also be disposed in the smartwatch to replace a standard right-handed circularly polarized antenna in the following description.

In an example, a linearly polarized antenna is disposed in the smartwatch. When the linearly polarized antenna receives right-handed circularly polarized waves (that is, positioning signals), there is a natural loss of 3 dB (that is, half of the energy) due to mismatch of the polarization characteristics. In other words, when the smartwatch receives the positioning signals through the linearly polarized antenna, although the positioning signal 1, the positioning signal 2, and the positioning signal 32 can be successfully received, quality of the received positioning signals is not good.

For example, the watch face of the smartwatch is provided with the right-handed circularly polarized antenna in a direction facing the sky. As shown in FIG. 3, the right-handed circularly polarized antenna in the smartwatch may better receive matching right-hand circularly polarized waves, such as the positioning signal 1 and the positioning signal 2. Since the positioning signal 32 is a left-handed circularly polarized wave, the right-handed circularly polarized antenna in the smartwatch cannot better receive the positioning signal 32. That is, the positioning signal 32 is better shielded. Therefore, in a current scenario, the smartwatch may be better positioned through the right-handed circularly polarized antenna disposed therein.

It is to be noted that, since the positioning signal is transmitted between the positioning satellite in the sky and the smartwatch on the ground, the right-handed circular polarization antenna on the smartwatch also has certain requirements for the attitude of the smartwatch in order to be capable of better receiving the positioning signal. For example, the watch face of the smartwatch may face the sky, so the right-handed circularly polarized antenna disposed therein can better receive a right-handed circularly polarized wave from the sky, to achieve better reception of the positioning signal.

However, when the smartwatch is worn on the wrist of the user, the attitude thereof is not static. In different states, attitudes of the smartwatch and the antenna disposed therein are also different. This also leads to significant differences in positioning conditions under different attitudes.

Figure 5:
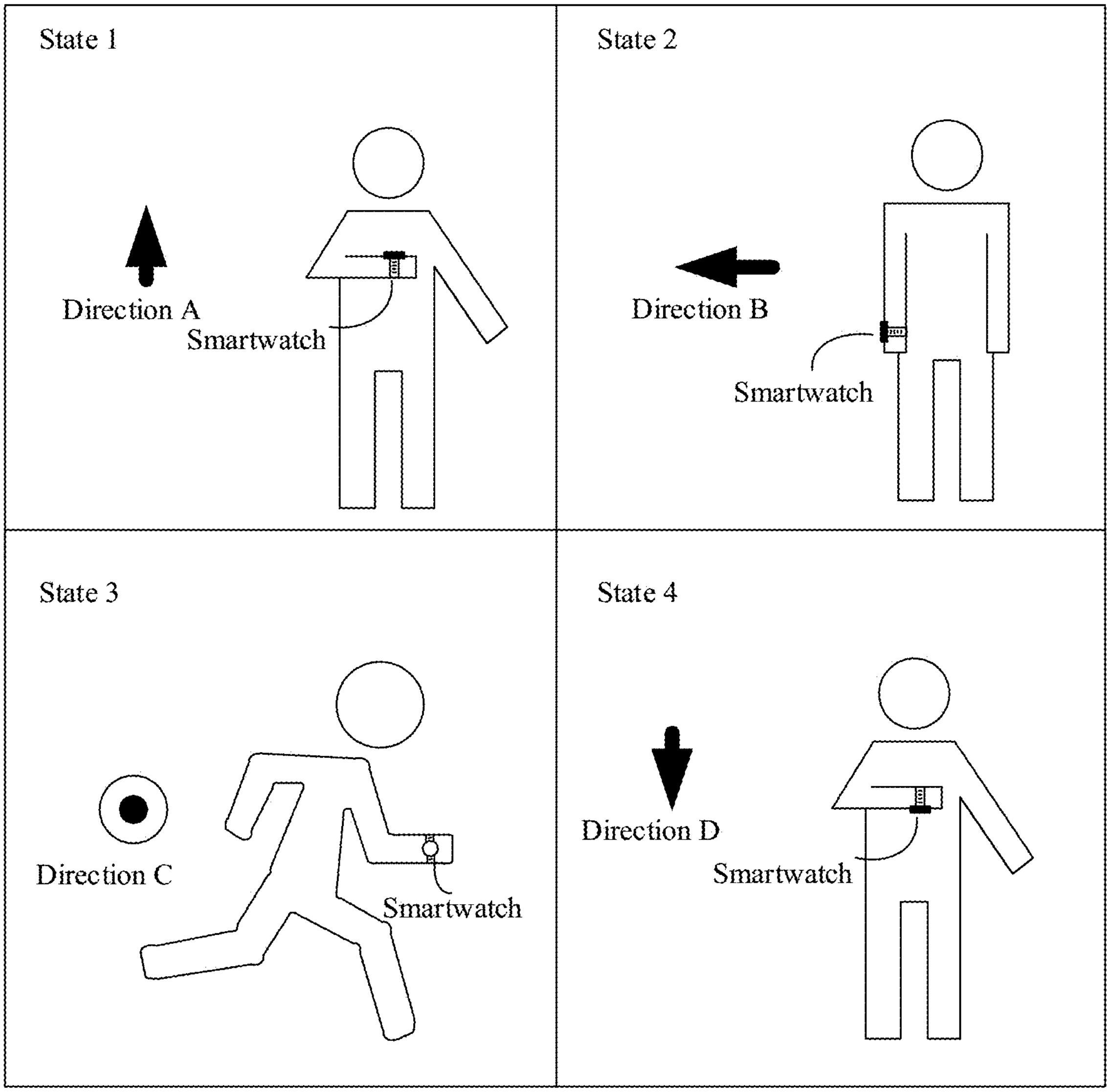
FIG. 5 is a schematic diagram of wearing states in different scenarios.

Exemplarily, FIG. 5 shows several common wearing states.

As shown in a state 1, in the wearing state, a direction the watch face points to may be a direction A, such as pointing to the sky. Then, in the state 1, when the antenna of the smartwatch has a right-handed circular polarization characteristic in a direction of the watch face relative to a signal transmission path from the sky, better reception of the positioning signals as shown in FIG. 3 can be realized, achieving accurate positioning.

As shown in a state 2, in the wearing state (for example, arms of the user are drooping), the direction the watch face points to may be a direction B. The direction B may be a horizontal direction pointing to the left. Then, when the antenna of the smartwatch has the right-handed circular polarization characteristic in the direction of the watch face, a right-handed circularly polarized wave on the left can be better received. However, in different cases, the positioning signal does not necessarily enter the smartwatch from the left. Therefore, in the state 2, due to differences in directions of arrival of signals in difference cases, the reception of the positioning signals by the smartwatch is unstable.

As shown in a state 3, in the wearing state (for example, the user is running), the direction the watch face points to may be a direction C. The direction C may be a horizontal direction perpendicular to a paper surface and outward. Similar to the state 2, when the antenna of the smartwatch has the right-handed circular polarization characteristic in the direction of the watch face, a right-handed circularly polarized wave on an outer side of the paper surface can be better received. However, in different cases, the positioning signal does not necessarily enter the smartwatch from the outer side of the paper surface. Therefore, in the state 3, due to differences in directions of arrival of signals in difference cases, the reception of the positioning signals by the smartwatch is unstable.

As shown in a state 4, some users are accustomed to wearing the watch face close to a pulse, that is, on an inner side of the wrist. Then, the direction the watch face points to may be a direction D. From the perspective of a far field, the direction D may be close to a vertical direction and used for receiving signals from the sky. However, since the direction of the watch face points to the direction D, the antenna exhibits right-handed circular polarization in the direction D (such as near a direction pointing to the ground). The antenna exhibits left-handed circular polarization in a direction pointing to the sky (i.e., a direction opposite to the direction D). Then, in the state 4, the smartwatch cannot normally receive the right-handed circularly polarized waves from the positioning satellites. Therefore, a positioning error may be larger.

Based on the above description, when the antenna in the smartwatch has a right-handed circular polarization characteristic, the smartwatch and the antenna therein have different attitudes in different wearing states or usage states. Then, in some attitudes, the antenna in the smartwatch cannot normally receive the positioning signals, resulting in inaccurate positioning. When the antenna in the smartwatch has the linear polarization characteristic, since the linearly polarized antenna can receive signals from all directions, the antenna in the smartwatch can receive the positioning signals in different attitudes. However, since linear polarization has a loss of 3 dB for the right-handed circularly polarized waves, the received positioning signals may also be poor, thereby leading to inaccurate positioning.

To address the above problem, an embodiment of this application provides a terminal antenna which has a polarization characteristic switching capability and may be adjusted to corresponding polarization characteristics in different attitudes. In this way, the antenna can have a better positioning signal receiving capability in different attitudes, thereby improving positioning accuracy in the different attitudes.

The antenna solution provided in this embodiment of this application is applicable to a smart wearable device and used for supporting a wireless communication function of the smart wearable device. For example, the smart wearable device may be a device such as a smartwatch or a smart bracelet. In some other embodiments, the antenna solution provided in this embodiment of this application is applicable to another electronic device. For example, the electronic device may be a portable mobile device such as a mobile phone, a tablet computer, a personal digital assistant (personal digital assistant, PDA), an augmented reality (augmented reality, AR) \ virtual reality (virtual reality, VR) device, or a media player. A specific form of the device is not particularly limited in this embodiment of this application.

Figure 6:
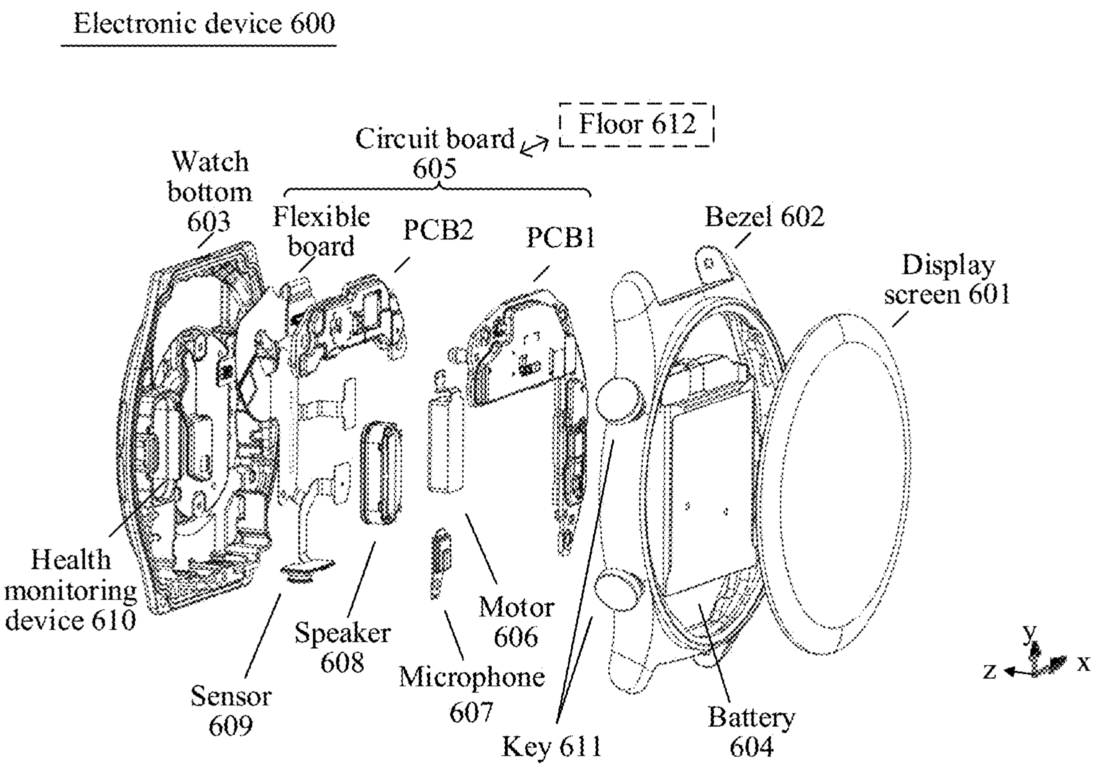
FIG. 6 is a schematic diagram of composition of an electronic device according to an embodiment of this application.

Exemplarily, refer to FIG. 6 which is a schematic diagram of composition of an electronic device 600 according to an embodiment of this application. The electronic device 600 may be a smartwatch.

As shown in FIG. 6, the electronic device 600 may include a display screen 601, a bezel 602, and a watch bottom 603. The display screen 601, the bezel 602, and the watch bottom 603 are assembled in sequence to acquire an appearance surface of the electronic device 600. Between the display screen 601 and the watch bottom 603, a plurality of structural/electronic components may be disposed inside the bezel 602. Exemplarily, the plurality of structural/electronic components may include, for example, a battery 604, one or more circuit boards 605, a motor 606, a microphone 607, a speaker 608, and a sensor 609.

Brief introductions are separately provided below.

The display screen 601 is configured to display, for example, an image and a video. The display screen 601 includes a display panel. The display panel may be a liquid crystal display 601 (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini LED, a micro LED, a micro-OLED, a quantum dot light emitting diode (quantum dot light emitting diodes, QLED), or the like. In some embodiments, the electronic device 600 may include one or a plurality of display screens 601. In different implementations, a shape of the display screen 601 may be circular, square, rectangular, or the like.

The bezel 602 is configured to provide support in directions around a watch body (such as directions x and y). The bezel 602 may include a closed ring structure made of a metal material. The metal material may include low-carbon steel, aviation aluminum, high-strength aluminum alloy, stainless steel, titanium alloy, and the like. In some implementations, the bezel 602 may further include a non-metal material. For example, at least part of the closed ring made of metal is wrapped with materials such as plastics and ceramics to realize individual appearance configuration of the bezel 602. Corresponding to different designs, the bezel 602 may be circular, square, rectangular, and the like. Exemplarily, the bezel 602 may alternatively be implemented through an in-mold injection molding process. For example, a metal skeleton is prepared by die casting, and plastic is injected on an outer side of the metal skeleton to acquire a complete bezel 602. In this example, the metal skeleton in the bezel 602 may correspond to the closed ring structure made of the metal material in the bezel 602 above. It is to be noted that, in some other embodiments of this application, the ring structure made of the metal material in the bezel 602 may alternatively be non-closed. For example, one or more openings are provided on the ring structure.

In some implementations, one or more keys 611 may be provided on an outer side of the bezel 602. The key 611 may be used as a physical input component, and the key 611 may receive operations such as pressing, long pressing, and/or rotation, and implement functions such as power on/off adjustment, volume adjustment, and time adjustment. The key 611 may be a mechanical key 611 or a touch key 611.

The watch bottom 603 is a bottom support of the electronic device 600. The watch bottom 603 may include a non-metal material, such as plastics, fiberglass, and/or ceramics. In some implementations, the watch bottom 603 may further include a metal material, such as low-carbon steel, aviation aluminum, high-strength aluminum alloy, stainless steel, and/or titanium alloy. In some implementations, to provide better wearing comfort and improve a degree of fit between the bezel 602 and the watch bottom 603, a gap between the bezel 602 and the watch bottom 603 may be filled with the non-metal material through a process such as injection molding.

One or more circuit boards 605 may be provided inside the electronic device 600. In this example, as shown in FIG. 6, the circuit board 605 may include PCB1, PCB2, and a flexible board. The plurality of circuit boards 605 may be connected through an electronic circuit to realize signal interaction. Specific implementations of different circuit boards 605 may be different. For example, the circuit board 605 may include an FPC, referred to as a flexible board; a PCB, and the like.

The circuit board 605 may serve as a carrier of an electronic device and an electronic circuit. Exemplarily, a processor may be disposed on the circuit board 605. The processor may include one or more processing units. For example, the processor may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be separate devices, or may be integrated into one or more processors. The processor may generate an operating control signal according to an instruction operation code and a sequence signal, to complete control of fetching and executing an instruction. A memory may be further disposed in the processor and configured to store an instruction and data. In some embodiments, the memory in the processor may be a cache. The memory may store an instruction or data that is recently used or cyclically used by the processor. If the processor needs to use the instruction or the data, the processor may directly invoke the instruction or the data from the memory. This avoids repeated access, and reduces a waiting time of the processor, thereby improving system efficiency. In some embodiments, the processor may be a microprocessor unit (Microprocessor Unit, MPU) or a microcontroller unit (Microcontroller Unit, MCU).

A communication module such as a radio frequency module may also be disposed on the circuit board 605. The radio frequency module is connected to a baseband processor through a baseband line, and the radio frequency module may also be connected to an antenna, thereby realizing a wireless communication function. Exemplarily, during signal transmission, the baseband processor sends a digital signal to the radio frequency module through the baseband line, and the radio frequency module converts and processes the digital signal to acquire a corresponding analog signal. The radio frequency module transmits the analog signal to the antenna, so that the antenna converts the analog signal into an electromagnetic wave to radiate outward. During signal reception, the antenna converts the electromagnetic wave into an analog signal carrying information and transmits the analog signal to the radio frequency module. The radio frequency module converts the analog signal into a digital signal after radio-frequency domain processing, and transmits the digital signal to the baseband processor. The baseband processor parses the digital signal to acquire information carried in the received signal.

With reference to the description in FIG. 2, in the example shown in FIG. 6, the circuit board 605 may provide a zero potential reference for each electronic component. For example, in some logic implementations, the circuit board 605 may be used as a reference ground of the antenna. In the following description of this application, a reference ground function of the circuit board 605 is abstracted as a floor 612 for illustration. Certainly, in some other embodiments, when the watch bottom 603 includes at least part of metal, the watch bottom 603 may cooperate with the floor 612 corresponding to the circuit board 605, or the watch bottom 603 may be used independently as the floor 612.

In this embodiment of this application, the bezel 602 may be configured to cooperate with the floor 612 to realize settings of the antenna. For example, the bezel 602 serves as part of the antenna radiator, and the floor 612 is provided as the reference ground of the antenna. In another example, a gap between the bezel 602 and the floor 612 may form a slot antenna to support the wireless communication function of the electronic device 600.

The battery 604 is disposed inside the electronic device 600. The battery 604 is configured to supply power to the electronic device 600.

The components of the electronic device 600 such as the motor 606, the microphone 607, and the speaker 608 may be connected to the circuit board 605 respectively, so that the processor on the circuit board 605 controls the corresponding components to implement corresponding functions. The motor 606 may be configured to generate a vibration prompt. The motor 606 may be configured for an incoming call vibration prompt and a touch vibration feedback. The microphone 607, also referred to as a "mouthpiece" or a "megaphone", is configured to convert a sound signal into an electrical signal. When making a call or sending voice information, a user may speak with the mouth approaching the microphone 607, to input a sound signal to the microphone 607. At least one microphone 607 may be disposed in the electronic device 600. The speaker 608, also referred to as a "horn", is configured to convert an audio electrical signal into a sound signal. The electronic device 600 may emit music through the speaker 608, or output an audio signal for a hands-free call.

The circuit board 605 may also be provided with one or more sensors 609, such as a pressure sensor, a gyro sensor, a magnetic sensor, an acceleration sensor, an optical proximity sensor, a fingerprint sensor, and a touch sensor. The different sensors 609 may be configured to support various functions of the electronic device 600. For example, the pressure sensor and/or the touch sensor may cooperate with the display screen 601 to implement a function of touch control.

The electronic device 600 may also be provided with a health monitoring device 610, such as a heart rate monitoring module or a blood pressure detection module. The health monitoring device 610 may be configured to detect health signs of the user, and provide acquired relevant data for the processor of the electronic device 600 or transmit the data to another electronic device 600 for processing, so as to achieve an effect of health detection.

It may be understood that FIG. 6 shows hardware composition of an electronic device 600 according to an embodiment of this application. In some other embodiments, the electronic device 600 may also have a modular structure, and different modules may communicate with each other to implement corresponding functions. As an example, refer to FIG. 7 which is a schematic diagram of composition of another electronic device 600 according to an embodiment of this application.

In this example, the electronic device 600 may include an attitude input module 701, a control module 702, and an antenna module 703. Referring to FIG. 6, the attitude input module 701 and the control module 702 may implement functions thereof through one or more devices on the circuit board 605 shown in FIG. 6.

Exemplarily, the attitude input module 701 may correspond to the sensor 609 and be configured to acquire current attitude information of the electronic device 600. Optionally, the attitude input module 701 may include an acceleration sensor, a gyroscope sensor, and the like. In some embodiments, the acceleration sensor and the gyroscope sensor may be packaged in a component (such as an A+G sensor), which can provide attitude information to determine current x, y, z three-axis displacements and angular velocities. Certainly, when the gyro sensor can detect more axial displacements, the attitude information may include the more axial displacements (such as six-axis displacements).

The control module 702 may correspond to the processor on the circuit board 605. For example, the processor may be a CPU, an MCU, and/or an AP. A sensor control center (Sensor HUB) may be disposed in the processor. The processor may be configured to process the attitude information, thereby acquiring corresponding control information. The control information may be used for controlling an operating state of the antenna module 703.

In some embodiments of this application, an attitude-polarization truth table may be stored in the control module 702, and the attitude-polarization truth table may include control information corresponding to different attitudes. Then, the control module 702 may determine a current attitude according to the attitude information from the attitude input module 701, and determine control information corresponding to the current attitude according to the attitude-polarization truth table.

In some other embodiments of this application, an attitude-polarization truth table may be stored in the control module 702, and the attitude-polarization truth table may include control information corresponding to different attitude information. Then, the control module 702 may determine the corresponding control information directly according to the attitude information from the attitude input module 701.

Figure 8:
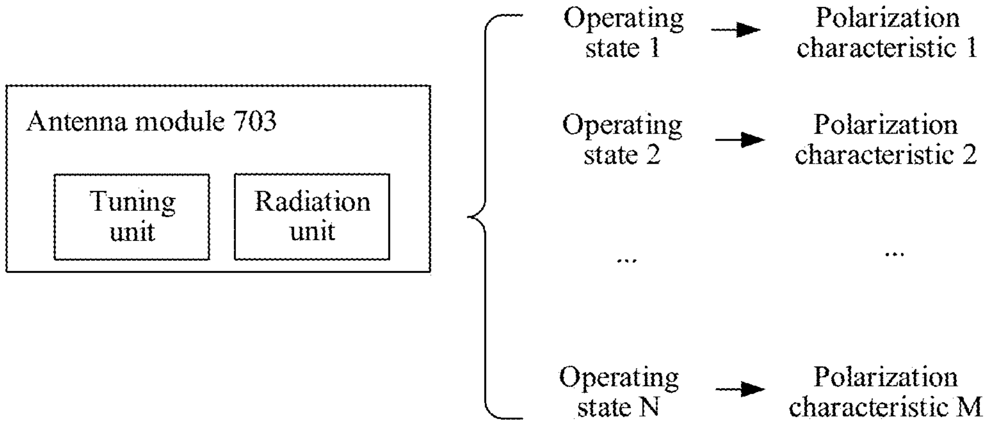
FIG. 8 is a schematic diagram of composition of an antenna module according to an embodiment of this application.

With reference to the example in FIG. 8, in this example, the antenna module 703 may include a tuning unit and a radiation unit. The tuning unit may correspond to a module with a tuning function in the antenna module 703, such as a tuning switch. The radiation unit may correspond to a module with a radiation function in the antenna module 703, such as a radiator. With reference to the example in FIG. 2, in the smartwatch, a radiation module may correspond to the bezel 201.

The tuning unit may operate in different on/off states under the control of the control module 702, thereby enabling the antenna module 703 to operate in different operating states. For example, the operating state of the antenna module 703 may include an operating state 1 to an operating state N, where N is an integer greater than or equal to 2. The N operating states may correspond to respective polarization characteristics. For example, the operating state 1 has a polarization characteristic 1, the operating state 2 has a polarization characteristic 2, the operating state N has a polarization characteristic M, and so on. The polarization characteristics in different operating states may be the same or different. That is, M is a positive integer less than or equal to N. In some embodiments, the N operating states include at least two operating states with different polarization characteristics.

Figure 7:
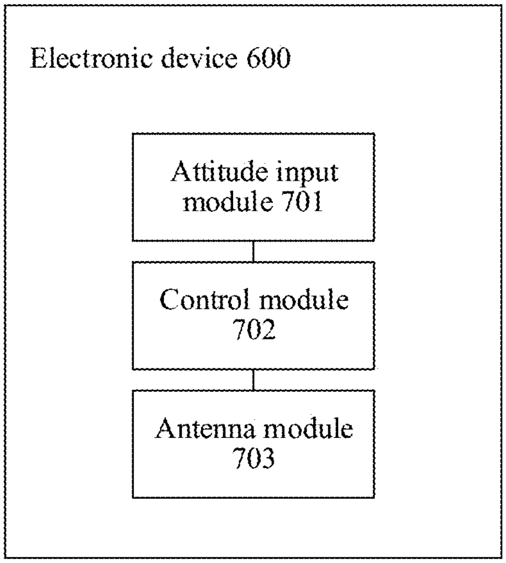
FIG. 7 is a schematic diagram of composition of an electronic device according to an embodiment of this application.

The antenna solution provided in this embodiment of this application is applicable to the electronic device 600 as shown in FIG. 6 or FIG. 7. It is to be noted that the composition in FIG. 6 or FIG. 7 is only an example, and does not constitute a limitation on the electronic device 600. In some other embodiments, the electronic device 600 may further include more or fewer components. Specific composition of the electronic device 600 is not limited in this embodiment of this application. The following is based on an example in which the electronic device 600 has the composition shown in FIG. 7.

Figure 9:
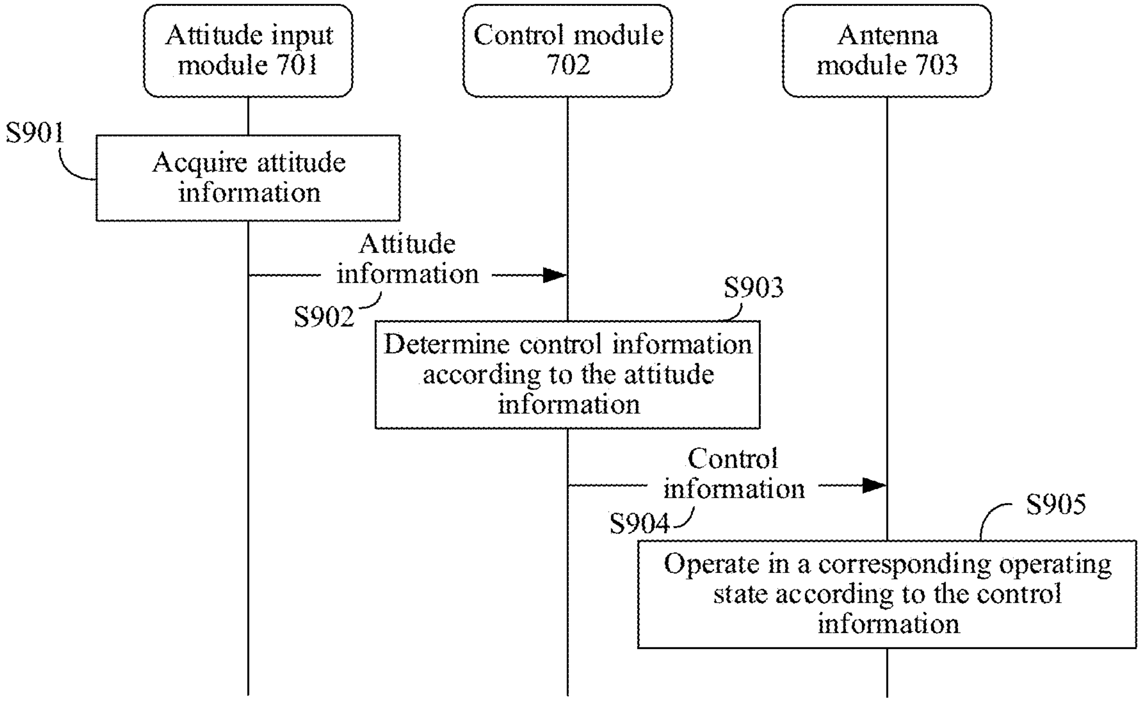
FIG. 9 is a schematic flowchart of an antenna switching method according to an embodiment of this application.

Refer to FIG. 9 which is a schematic diagram of module interaction according to an embodiment of this application. Based on this solution, the electronic device can automatically adjust the operating state of the antenna according to the current attitude. In this way, the antenna can provide a polarization characteristic corresponding to the current attitude for efficient reception of signals (such as positioning signals). In the following example, the electronic device is a smartwatch (referred to as a watch). As shown in FIG. 9, the solution may include the following steps:

S901: The attitude input module 701 acquires attitude information.

Exemplarily, when the watch needs to be positioned, the A+G sensor may acquire current attitude information of the watch. The attitude information may include at least one of the following: three-axis (such as x, y, z) or six-axis displacement and angular velocity information.

S902: The attitude input module 701 sends the attitude information to the control module 702.

Exemplarily, the attitude input module 701 may transmit the attitude information to the Sensor HUB, to facilitate the Sensor HUB to perform processing.

S903: The control module 702 determines control information according to the attitude information.

For example, an attitude-polarization truth table is stored in the control module 702. The control module may determine a current attitude according to the attitude information, and then query the attitude-polarization truth table to determine the control information of the antenna module 703.

Exemplarily, the control module 702 may determine, according to the attitude information, a current direction the watch face points to. Then, an attitude corresponding to the attitude information is determined according to the direction the watch face points to.

Figure 10:
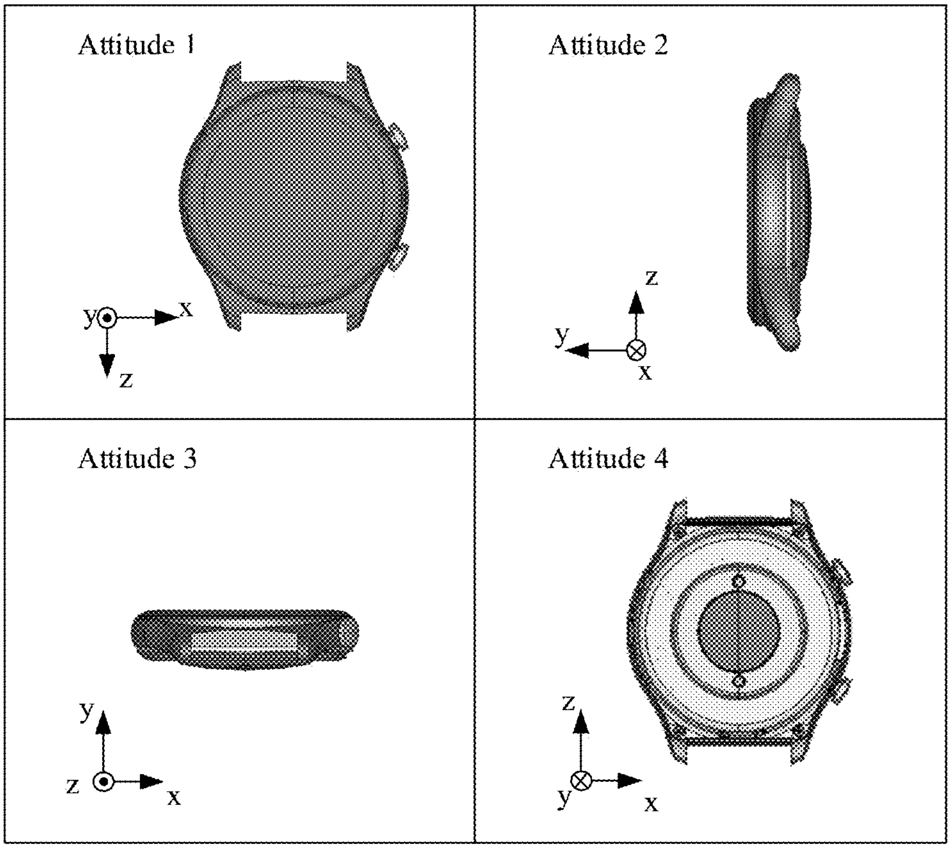
FIG. 10 is a schematic diagram of different antenna attitudes according to an embodiment of this application.

As an example, attitudes of the watch include an attitude 1, an attitude 2, an attitude 3, and an attitude 4. Refer to FIG. 10 which shows attitudes of the watch respectively corresponding to the attitude 1, the attitude 2, the attitude 3, and the attitude 4 by taking the watch looking down from the sky as an example. As shown in FIG. 10, the attitude 1 may correspond to that the watch face points to the sky, that is, perpendicular to the horizontal plane and upward in an earth coordinate system. The attitude 1 may correspond to the state 1 shown in FIG. 5. The attitude 2 may correspond to that the watch face points to the horizontal direction. That is, a direction the watch face points to is parallel to the horizontal plane in the earth coordinate system. In the attitude 2, a direction a lug points to may be parallel to the horizontal plane. The attitude 2 may correspond to the state 2 shown in FIG. 5. The attitude 3 may correspond to that the watch face points to the horizontal direction. That is, the direction the watch face points to is parallel to the horizontal plane in the earth coordinate system. Different from the attitude 2, a direction the lug in the attitude 3 points to may be perpendicular to the horizontal plane. Then, the attitude 3 may correspond to the state 3 shown in FIG. 5. The attitude 4 may correspond to that the watch face points to the ground, which corresponds to the state 4 shown in FIG. 5. It is to be noted that, in this embodiment of this application, directions corresponding to various attitudes may not be absolute. For example, in the attitude 1, the watch face points to the sky, which may also include that the watch face points to a region near the sky. It is to be understood that, since the user wearing the watch is far away from the positioning satellite in the sky, when the watch face points to the region near the sky, the watch face is perpendicular to the horizontal plane and points to the sky. Descriptions of directions in other attitudes are similar. For example, in the attitude 2, the watch face points to the horizontal direction, which may also include that the watch face points near the horizontal direction. The rest may be deduced by analogy.

In this way, according to the attitude information, the watch can determine differences between a current direction indicated by the watch face and a direction indicated by the watch face corresponding to each of the four attitudes shown in FIG. 10. The attitude with the smallest difference is selected as the current attitude corresponding to the watch. For example, according to the attitude information, it is determined that the current direction the watch face points to is most approximately perpendicular to the horizontal plane and upward, and then it may be determined that the watch may currently be in the attitude 1. In another example, according to the attitude information, it is determined that the current direction the watch face points to is most approximately parallel to the horizontal plane and the direction of the lug is perpendicular to the horizontal plane, and then it may be determined that the watch may currently be in the attitude 3.

In some other embodiments of this application, different attitudes may cover different regions. In other words, the attitude 1, the attitude 2, the attitude 3, and the attitude 4 may divide the space into at least 3 regions. Then, the control module 702 may determine, according to the attitude information, that the current direction the watch face points to is located in one of the 3 regions, and the corresponding attitude is the current attitude of the watch.

Figure 11:
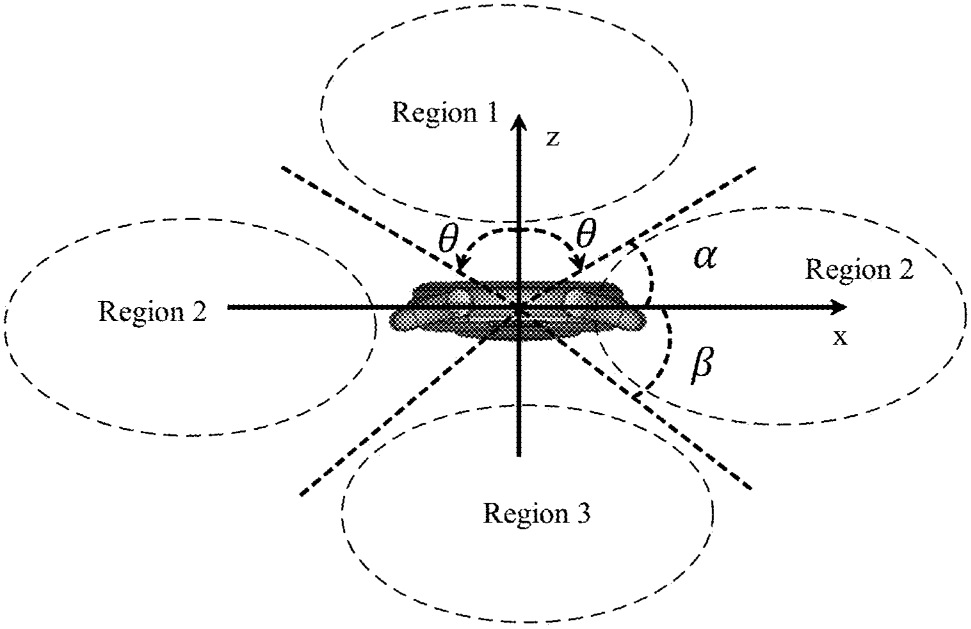
FIG. 11 is a schematic diagram of regional division according to an embodiment of this application.

Exemplarily, refer to FIG. 11 which illustrates a spatial region division corresponding to different attitudes. Based on the watch face pointing to the sky, the space may be divided into a region 1 to a region 3, corresponding to the attitude 1 to the attitude 4 respectively. For example, when the current direction the watch face points to falls within the region 1, the current attitude is determined as the attitude 1. When the current direction the watch face points to falls within the region 2, the current attitude is determined as the attitude 2 or the attitude 3. When the current direction the watch face points to falls within the region 3, the current attitude is determined as the attitude 4.

It may be understood that, in the example of spatial region division in FIG. 11, the antenna in the watch has a right-handed circular polarization characteristic for the direction pointing to the sky. Then, with reference to the description of the example of the directional diagram of the circularly polarized antenna in FIG. 4, in the region 1 shown in FIG. 11, the antenna may correspond to the right-handed circular polarization characteristic, in the region 2, the antenna may correspond to the linear polarization characteristic, and in the region 3, the antenna may correspond to the left-handed circular polarization characteristic. In some embodiments, a junction between the region 1 and the region 2 may be determined according to a circular polarization axis ratio AR of the antenna. The AR may be used for indicate a degree of circular polarization in different directions. A larger AR indicates a lower degree of circular polarization and being closer to linear polarization. Conversely, a smaller AR indicates a higher degree of circular polarization and being closer to circular polarization. In some embodiments, when the AR is less than 6 dB, the antenna may correspond to elliptical circular polarization, which can achieve effective reception of a circularly polarized signal. Exemplarily, the axial ratio AR at the junction between the region 1 and the region 2 is 6 dB. A plane where the watch is located in used as a reference plane, $\alpha$ is used for indicating an angle, which is on one side of the watch face, between a direction on the reference plane when the axial ratio AR is equal to 6 dB and the reference plane, and $\beta$ is used for indicating an angle, which is on one side of the watch bottom on the reference plane, between a direction when the axial ratio AR is equal to 6 dB and the reference plane. $\theta$ indicates an angle between a current direction the watch face points to and a direction perpendicular to the horizontal plane and pointing to the sky.

Then, in the case of $$\theta \in \left(0, \frac{\pi}{2} - \alpha\right),$$

the current direction the watch face points to falls within the region 1, and the control module 702 may determine that the watch is in the attitude 1. In the case of $$\theta \in \left(\frac{\pi}{2} + \beta, \pi\right),$$

the current direction the watch face points to falls within the region 3, and the control module 702 may determine that the watch is in the attitude 4. In the case of $$\theta \in \left(\frac{\pi}{2} - \alpha, \frac{\pi}{2} + \beta\right),$$

the current direction the watch face points to falls within the region 2, and the control module 702 may determine that the watch is in the attitude 2 or the attitude 3.

In the example of FIG. 11 above, it is illustrated that division of different regions is determined according to the axial ratio AR. In this way, after the antenna is disposed in the watch, information thereof such as the axial ratio AR has been determined when the watch face points to the sky to provide the right-handed circular polarization characteristic. Therefore, the angles (as in the above example) such as $\alpha$ and $\beta$ corresponding to the region 1, the region 2, and the region 3 classified according to the axial ratio AR may also be predetermined and be preset in the watch. In this way, when the watch needs to be positioned, which region the direction the watch face currently points to is located in may be determined based on the stored angle information such as $\alpha$ and $\beta$, and then the corresponding attitude is determined. It is to be noted that, in some other embodiments of this application, the division of the region 1 to the region 3 may alternatively be determined through an actual field test and preset in the watch. A manner of division of different regions is not limited in this embodiment of this application. In this application, the region 1 may correspond to pointing near the sky, the region 2 may correspond to pointing near the horizontal direction, and the region 3 may correspond to pointing near the ground.

In this way, the control module 702 may determine a current attitude of the watch according to the attitude information.

In this embodiment of this application, an attitude-polarization truth table may be configured in the control module 702. As an example, an example of the attitude-polarization truth table is given in Table 1 below.

TABLE 1

| Attitude | Control information |
|---|---|
| Attitude 1 | Control information 1 |
| Attitude 2 | Control information 2 |
| Attitude 3 | Control information 3 |
| Attitude 4 | Control information 4 |

In this example, the attitude 1 may correspond to the control information 1. The control information 1 may control the antenna module 703 to provide a right-handed circular polarization characteristic. The attitude 4 may correspond to the control information 4. The control information 4 may control the antenna module 703 to provide a left-handed circular polarization characteristic. The attitude 2 and the attitude 3 may correspond to the control information 2 and the control information 3 respectively. Since the watch face points to the horizontal direction in both the attitude 2 and the attitude 3, in some embodiments of this application, the control information 2 and the control information 3 may be the same, and the control information 2 or the control information 3 may be used for controlling the antenna module 703 to provide a linear polarization characteristic. With reference to the description in FIG. 8, the control information may be control information for the tuning unit in the antenna module 703. For example, the tuning unit is a tuning switch. Then, according to different tuning switches, the control information may correspond to control signals of the tuning switches, such as a general purpose input and output (General Purpose Input Output, GPIO) control signal and a mobile industry processor interface (Mobile Industry Processor Interface, MIPI) control signal.

S904: The control module 702 sends the control information to the antenna module 703.

The control information may be determined according to current attitude information. In some embodiments, the control information may be used for controlling the tuning unit in the antenna module 703 to operate in a corresponding on/off state. Different control information corresponds to different on/off states.

S905: The antenna module 703 operates in a corresponding operating state according to the control information.

Exemplarily, with reference to the description in S703, when receiving the control information 1, the antenna module 703 may adjust the operating state to provide the right-handed circular polarization characteristic. When receiving the control information 4, the antenna module 703 may adjust the operating state to provide the left-handed circular polarization characteristic. When receiving the control information 2 or the control information 3, the antenna module 703 may adjust the operating state to provide the linear polarization characteristic.

In this way, the watch can automatically adjust the operating state according to the current attitude information when positioning is required. Therefore, the antenna of the watch can provide the corresponding polarization characteristics, so that the antenna in the watch can better receive positioning information in each wearing state and perform accurate positioning.

As an example, with reference to the several different wearing states shown in FIG. 5, based on the solution shown in FIG. 9, in the attitudes of the watch corresponding to different wearing states, the watch may adjust the antenna to provide the corresponding polarization characteristics as shown in Table 2.

TABLE 2

| Wearing state | Adjusted polarization characteristic |
|---|---|
| State 1 | Right-handed circular polarization |
| State 2 | Linear polarization |
| State 3 | Linear polarization |
| State 4 | Left-handed circular polarization |

As shown in Table 2, when the wearing state is the state 1 shown in FIG. 5, the watch may determine, based on the solution shown in FIG. 9, that the watch face currently points near the sky. Then, the watch may control the antenna therein to provide the right-handed circular polarization characteristic, so as to receive the positioning signals. When the wearing state is the state 2 or the state 3 as shown in FIG. 5, the watch may determine, based on the solution as shown in FIG. 9, that the watch face currently points the horizontal direction. Then, the watch may control the antenna therein to provide the linear polarization characteristic, so as to receive the positioning signals through a better omnidirectional receiving capability of the linearly polarized antenna. When the wearing state is the state 4 shown in FIG. 5, the watch may determine, based on the solution shown in FIG. 9, that the watch face currently points near the ground. Then, the watch may control the antenna therein to provide the left-handed circular polarization characteristic, so as to receive the positioning signals.

The solution provided in this embodiment of this application is continuously described below with reference to the specific scenario shown in FIG. 5.

Exemplarily, in some embodiments, the current wearing state is the state 1 shown in FIG. 5.

Figure 12:
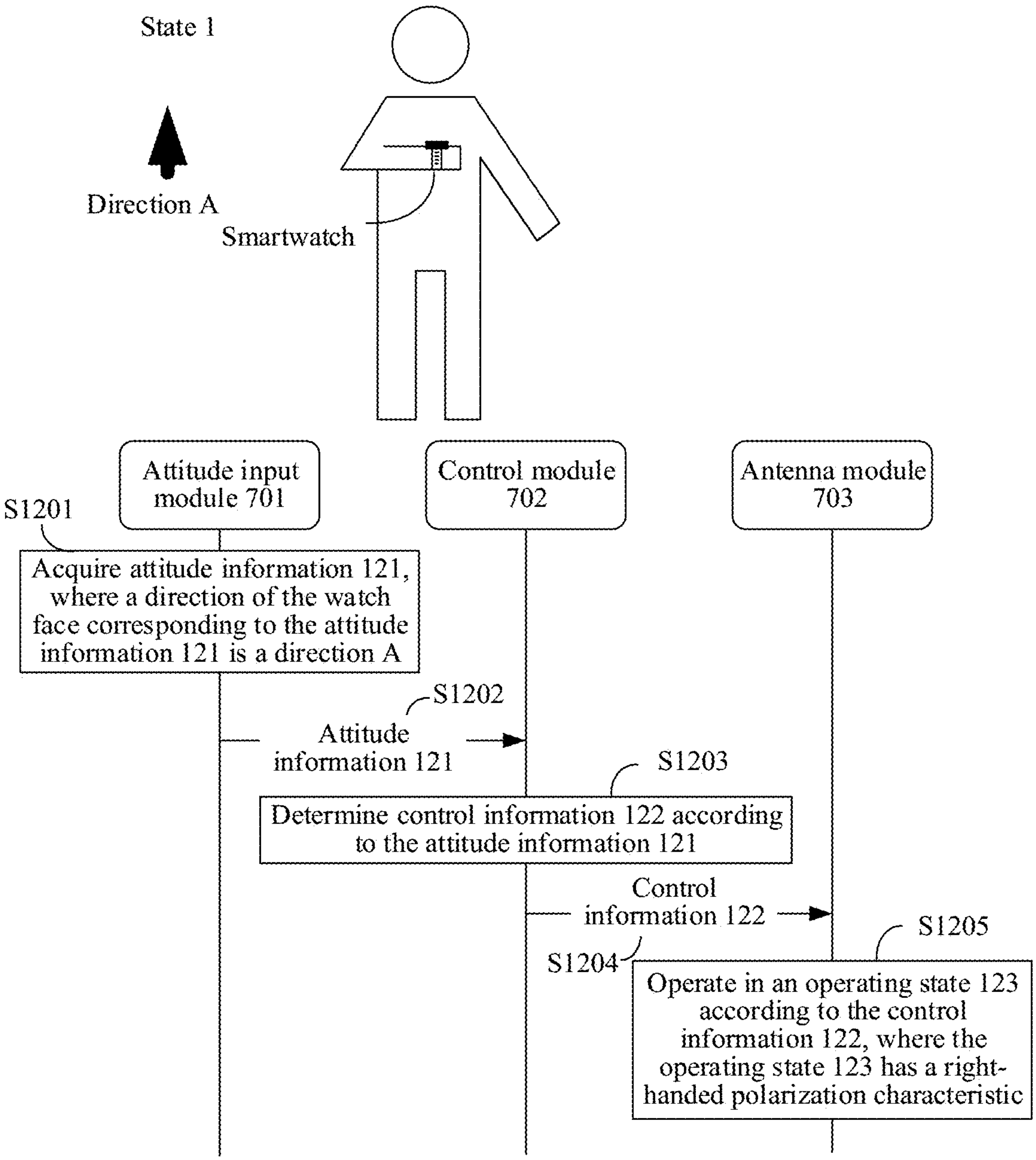
FIG. 12 is a schematic flowchart of an antenna switching method according to an embodiment of this application.

Refer to FIG. 12 which is another schematic diagram of module interaction according to an embodiment of this application. Based on the solution, the watch can provide the right-handed circular polarization characteristic, so as to better receive the positioning signals from the sky and achieve accurate positioning. As shown in FIG. 12, the solution may include the following steps:

S1201: The attitude input module 701 acquires attitude information 121, where a direction of the watch face corresponding to the attitude information 121 is a direction A.

The execution of S1201 may correspond to S901 shown in FIG. 9, and specific implementations thereof may be cross-referenced. In this example, the direction A may be a direction in which the watch face points to the sky (or points near the sky).

S1202: The attitude input module 701 sends the attitude information 121 to the control module 702.

The execution of S1202 may correspond to S902 shown in FIG. 9, and specific implementations thereof may be cross-referenced.

S1203: The control module 702 determines control information 122 according to the attitude information 121.

The execution of S1203 may correspond to S903 shown in FIG. 9, and specific implementations thereof may be cross-referenced.

Exemplarily, the control module 702 may determine, according to the attitude information 121, that a current direction the watch face points to is located in the region 1 shown in FIG. 11. The control module 702 may determine the current attitude of the watch as the attitude 1 accordingly. Then, based on the attitude-polarization truth table shown in Table 1, the control module 702 may determine control information 1 corresponding to the attitude 1. The control information 1 may correspond to the control information 122 in this example. The control information 122 may be used for controlling the antenna module 703 to provide a right-handed circular polarization characteristic.

S1204: The control module 702 sends the control information 122 to the antenna module 703.

S1205: The antenna module 703 operates in an operating state 123 according to the control information 122, where the operating state 123 has a right-handed polarization characteristic.

In some other embodiments, for example, the current wearing state is the state 2 shown in FIG. 5.

Figure 13:
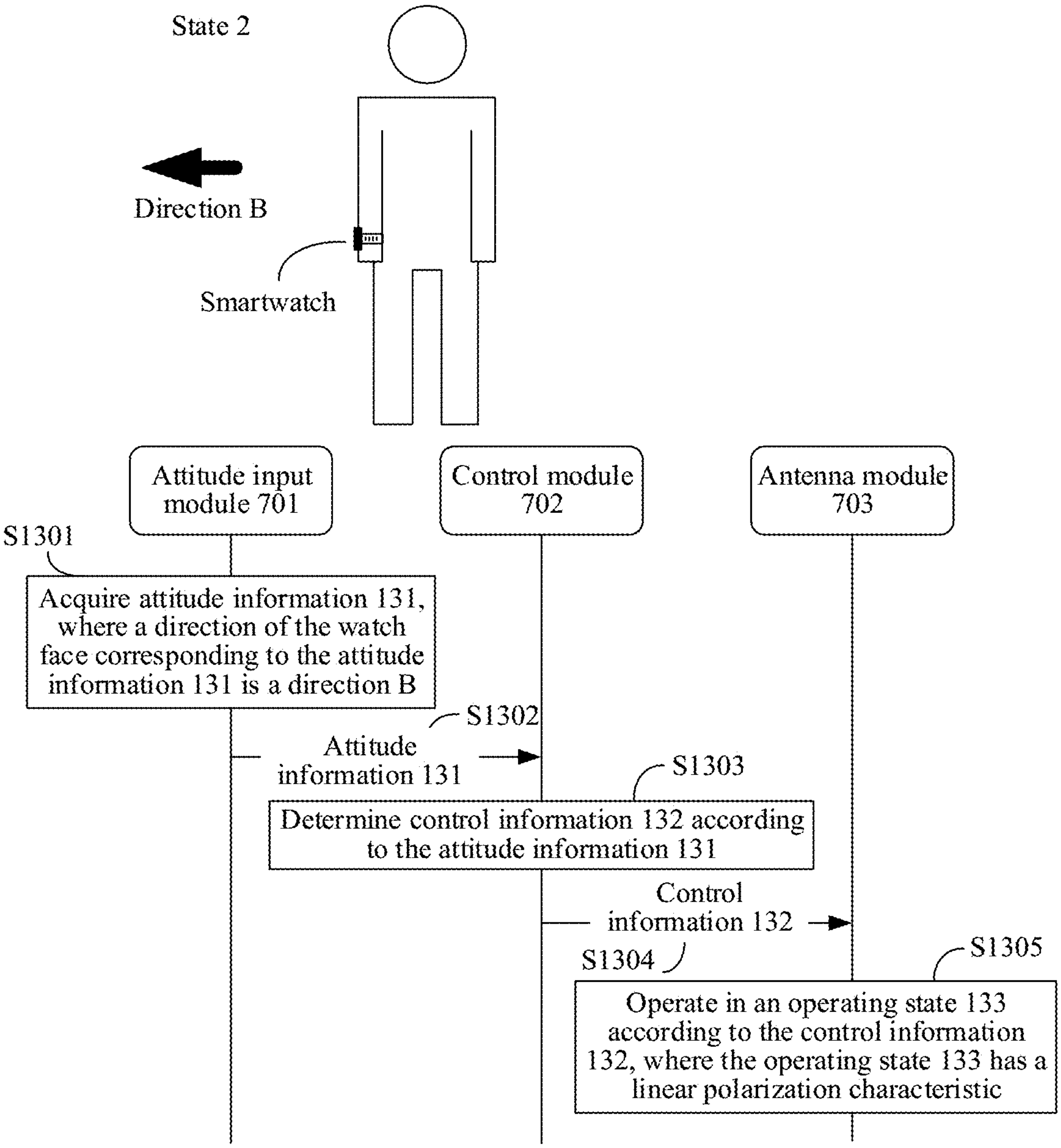
FIG. 13 is a schematic flowchart of an antenna switching method according to an embodiment of this application.

Refer to FIG. 13 which is another schematic diagram of module interaction according to an embodiment of this application. Based on the solution, the watch can provide a linear polarization characteristic, so as to stably receive the positioning signals from the sky based on stable linear polarization coverage at various angles in space to achieve accurate positioning even if the antenna in the watch cannot better receive the positioning signals from the sky through the left-handed circular polarization/right-handed circular polarization characteristic. As shown in FIG. 13, the solution may include the following steps:

S1301: The attitude input module 701 acquires attitude information 131, where a direction of the watch face corresponding to the attitude information 131 is a direction B.

The execution of S1301 may correspond to S901 shown in FIG. 9, and specific implementations thereof may be cross-referenced. In this example, the direction B may be a direction in which the direction the watch face points to is parallel to the horizontal plane.

S1302: The attitude input module 701 sends the attitude information 131 to the control module 702.

The execution of S1302 may correspond to S902 shown in FIG. 9, and specific implementations thereof may be cross-referenced.

S1303: The control module 702 determines control information 132 according to the attitude information 131.

The execution of S1303 may correspond to S903 shown in FIG. 9, and specific implementations thereof may be cross-referenced.

Exemplarily, the control module 702 may determine, according to the attitude information 131, that a current direction the watch face points to is located in the region 2 shown in FIG. 11. The control module 702 may determine the current attitude of the watch as the attitude 2 or the attitude 3 accordingly. Then, based on the attitude-polarization truth table shown in Table 1, the control module 702 may determine control information 2 or control information 3 corresponding to the current attitude. The control information 2 or the control information 3 may correspond to the control information 132 in this example. The control information 132 may be used for controlling the antenna module 703 to provide a linear polarization characteristic.

S1304: The control module 702 sends the control information 132 to the antenna module 703.

S1305: The antenna module 703 operates in an operating state 133 according to the control information 132, where the operating state 133 has a linear polarization characteristic.

In the examples in FIG. 9 to FIG. 13 above, the watch may flexibly adjust the polarization characteristic provided by the antenna according to the current attitude information, so that the antenna can provide an operating condition in line with the current wearing state. In some other embodiments of this application, the watch may also have a feedback mechanism, and after the antenna is controlled to operate in a certain state, the operating state of the antenna in the watch is optimized through signals received by the antenna, so as to provide a polarization characteristic more matching the current wearing state and achieve an effect of optimizing the quality of the received positioning signals.

Figure 14:
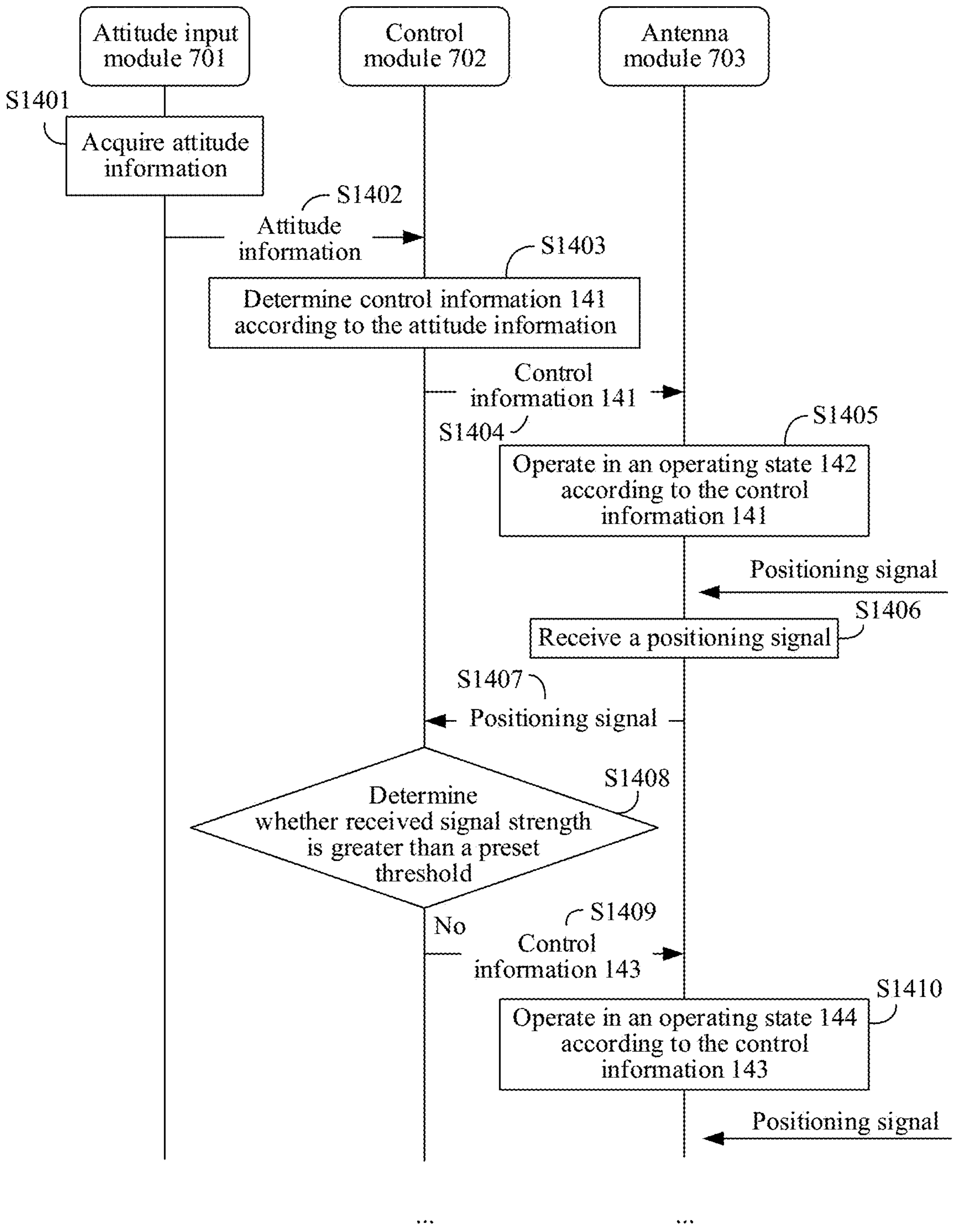
FIG. 14 is a schematic flowchart of an antenna switching method according to an embodiment of this application.

Exemplarily, refer to FIG. 14 which is another schematic diagram of module interaction according to an embodiment of this application. For example, based on the solution shown in FIG. 9 or FIG. 12 or FIG. 13, the watch controls, according to the attitude information, the antenna to provide a corresponding polarization characteristic. As shown in FIG. 14, the solution may include the following steps:

S1401: The attitude input module 701 acquires attitude information.

S1402: The attitude input module 701 sends the attitude information to the control module 702.

S1403: The control module 702 determines control information 141 according to the attitude information.

S1404: The control module 702 sends the control information 141 to the antenna module 703.

S1405: The antenna module 703 operates in an operating state 142 according to the control information 141.

In this example, the execution of S1401 to S1405 may correspond to S901 to S905 in FIG. 9 above, or S1201 to S1205 in FIG. 12, or S1301 to S1305 in FIG. 13, and execution of the steps may be cross-referenced. Details are not described herein again.

After the antenna module operates in the operating state 142, a positioning signal may be received based on a current polarization characteristic. For example, the following S1406 is performed.

S1406: The antenna module 703 receives a positioning signal.

S1407: The antenna module 703 sends the positioning signal to the control module 702.

It is to be understood that the antenna module 703 may convert an electromagnetic wave corresponding to the positioning signal into an analog signal/digital signal, and transmit the analog signal/digital signal to the control module 702 for processing. In S1407, the positioning signal sent by the antenna module 703 to the control module 702 may be the analog signal/digital signal corresponding to the received positioning signal in the form of the electromagnetic wave.

When the polarization characteristics provided by the antenna module 703 are different, combined with the current wearing state, electrical parameters of the received positioning signal are also different. The electrical parameters may include signal strength, a signal bit error rate, and the like.

S1408: The control module 702 determines whether received signal strength is greater than a preset threshold.

Exemplarily, the control module 702 may determine whether the received signal strength is sufficient to meet a current positioning requirement. For example, the preset threshold may be set in the control module 702. When the received signal strength is greater than the preset threshold, it is determined that the current positioning requirement is met, and the operating state of the antenna module 703 is not adjusted. Conversely, when the received signal strength is less than the preset threshold, it is determined that the current positioning requirement is not met, and the operating state of the antenna module 703 needs to be adjusted. Then, the control module 702 may continue to perform the following S1409.

In some embodiments of this application, the control module 702 may repeatedly measure the received signal strength in the operating state when it is determined that the received signal strength in the current operating state is less than the preset threshold. If multiple measurement results all indicate that the received signal strength in the current state is less than the preset threshold, the control module 702 determines to perform S1409.

S1409: The control module 702 sends the control information 143 to the antenna module 703.

The control information 143 may be different from the control information 141, so that the antenna module 703 can provide a polarization characteristic different from that in the current state.

S1410: The antenna module 703 operates in an operating state 144 according to the control information 143.

A polarization characteristic corresponding to the operating state 144 is different from that corresponding to the operating state 142. Next, the antenna module 703 may receive a positioning signal based on the adjusted polarization characteristic. Therefore, the method goes back to S1406, until the control module determines that the received signal strength is greater than the preset threshold. In some embodiments, if it is determined that signal strength of the positioning signal received under the current polarization characteristic is less than the preset threshold, the control module 702 may control the antenna module 703 to return to each state that has been traversed, and the state with the best signal strength continues to operate. It is to be noted that, in this example, to prevent an influence of frequent switching on system stability, the control module 702 may appropriately extend operating time of each operating state (such as 2 s) during the switching of the operating state. Another operating state is switched to after the operating time (for example, after 2 s).

In this way, even if the current positioning requirement cannot be met according to a preset attitude-polarization truth table, the watch can also adjust the polarization characteristic currently provided by the antenna, so that the antenna can operate in the operating state more matching the current wearing state and perform more accurate positioning.

Based on the solution shown in FIG. 14, for example, the preset threshold is CNO=25 dB. When the received signal strength is greater than or equal to 25 dB, the corresponding received signal strength is acceptable, and the antenna module 703 may operate in the current operating state.

Correspondingly, when the received signal strength is less than 25 dB, the corresponding received signal strength is poor, and the control module 702 may control the antenna module 703 to try to operate in another operating state, so as to improve operational performance of the antenna module 703.

For example, at a certain moment, the current wearing state is identified as the state 1, which corresponds to right-handed circular polarization. In this case, a receiver of the watch obtains by demodulation that current CNo is less than 25 dB, and it is considered that the current received signal strength is poor. Then, the antenna in the watch may be quickly switched to another operating state. The receiver of the watch continues to demodulate the current received signal strength, and if CNo is greater than 25 dB, the antenna remains in the current operating state. If there is still no scenario where CNo is greater than or equal to 25 dB after traversal of all operating states, the operating state with the highest received signal strength in a past period of time is selected as the current operating state.

It is to be noted that, during the above switching, the watch may improve accuracy of judgment through some software stabilization algorithms. For example, the software stabilization algorithms may be as follows: When switching to next operating state, the watch may continuously measure the received signal strength multiple times (e.g., 10 times within 1 ms), and determine the received signal strength each time. The received signal strength acquired by multiple measurements is averaged as the received signal strength in the operating state, which is compared with the preset threshold for judgment. In addition, as described above, when the received signal strength in all the operating states is less than 25 dB, constant switching should be avoided, and the operating state is switched after a certain state is maintained for a long time (such as 2 s). Therefore, system instability caused by frequent switching is prevented.

In some other embodiments of this application, the watch may alternatively control, through the control module 702, the antenna module 703 to traverse the operating states corresponding to the attitudes in the attitude-polarization truth table, and measure the received signal strength in each operating state. The watch may select the operating state with the highest received signal strength through the control module 702, and control the antenna module 703 to operate in the operating state to provide the corresponding polarization characteristic, so as to better receive the positioning signals, thereby improving positioning accuracy.

In some other embodiments of this application, the watch may alternatively control the antenna module 703 to operate in a preset initial state when it is determined that positioning is required, and directly perform S1406, thereby also enabling the watch to control the antenna module 703 to provide a polarization characteristic matching the current wearing state.

Through the description of the above embodiments, a person skilled in the art can clearly understand that, according to the solutions provided in the embodiments of this application, the electronic device can automatically adjust the polarization characteristic of the current antenna, so as to better receive the positioning signals and improve positioning accuracy. In different embodiments, the antenna applied to this application may have different implementations. The antenna may operate in different operating states and provide at least two different polarization characteristics.

A possible implementation of the antenna solution applied to the solution provided in the embodiments of this application is given below for reference in conjunction with the accompanying drawings.

Figure 15:
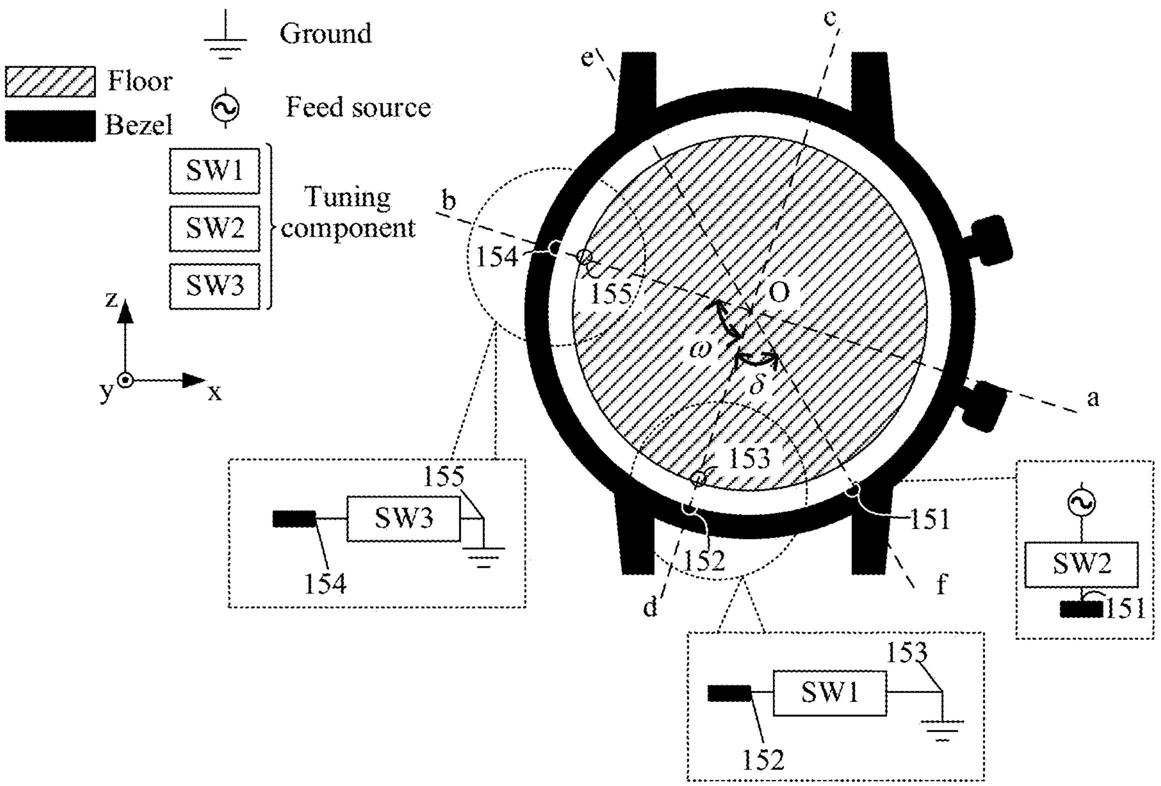
FIG. 15 is a schematic diagram of composition of an antenna according to an embodiment of this application.

Exemplarily, refer to FIG. 15 which illustrates composition of an antenna solution according to an embodiment of this application. In this example, an antenna is disposed in a watch. The antenna may be provided with a tuning component. When the tuning component operates in different operating states, the antenna may provide different polarization characteristics.

As shown in FIG. 15, the antenna may include a radiator. The radiator may be a metal bezel of the watch. With reference to the illustration of the composition of the watch shown in FIG. 6, the radiator of the antenna may correspond to the bezel 602 shown in FIG. 6.

The floor 612 in the watch may provide a zero-potential reference for the antenna and be used as a reference ground (i.e., the floor).

The radiator of the antenna provided in this embodiment of this application may be provided with a feed point and at least two ground points. The above tuning component may be disposed on one of the ground points. In different implementations, the tuning component may implement a function thereof through a switch (such as SPDT, 2SPST, or SP4T) and/or an adjustable device. In this application, description is based on an example in which the tuning component is a switch (such as SP2T). The switch may be provided with two paths, and different tuning devices, such as an inductor, a capacitor, and a resistor, may be provided on different paths. In the case of switching to different paths, a frequency band covered by an excitation mode on the antenna can be adjusted accordingly, so that the antenna provides different polarization characteristics.

Exemplarily, as shown in FIG. 15, a straight line where a feed point 151 is connected to a geometric center O of the watch face of the watch may be a straight line ef. Taking the straight line ef as a reference, a straight line cd is obtained by rotating δ degrees counterclockwise along the geometric center O. δ may be included in a range of 45+/−15 degrees.

In two points where the straight line cd intersects the bezel, the point close to the feed point 151 may be provided with a ground point 152. In this example, the ground point 152 may be grounded through a nearby connection to the floor at a point 153 through a switch $SW_1$.

Taking the straight line cd as a reference, a straight line ab is obtained by rotating @ degrees counterclockwise along the center O. ω may be included in a range of 90+/−15 degrees.

In two points where the straight line ab intersects the bezel, the point away from the feed point 151 may be provided with a ground point 154. In this example, the ground point 154 may be grounded through a nearby connection to the floor at a point 155 through the switch.

It is to be noted that, in some embodiments of this application, a tuning component may also be provided on a link where the feed point 151 and/or the ground point 154 are/is located, so as to realize adjustment of parameters such as a port/impedance of the antenna.

Exemplarily, as shown in FIG. 15, a tuning component $SW_2$ may be provided at the feed point 151, and the tuning component $SW_2$ may be provided between a feed source and the feed point 151. Similar to the setting of $SW_1$, the tuning component SW2 may implement a function thereof through a switch (such as SPDT, 2SPST, or SP4T) and/or an adjustable device. It is to be noted that, in some embodiments, $SW_2$ may have a switching function, and realize flexible adjustment in different scenarios through multi-channel switching. In some other embodiments, $SW_2$ may include one or more capacitors/inductors/resistors to adjust port impedance through a simpler setting than the switch.

Similarly, a tuning component $SW_3$ may be provided at the ground point 154, and the tuning component $SW_3$ may be provided between the ground point 154 and a point 155 on the floor. The tuning component $SW_3$ may implement a function thereof through a switch (such as SPDT, 2SPST, or $SP_4T$) and/or an adjustable device. It is to be noted that, in some embodiments, $SW_3$ may have a switching function, and realize flexible adjustment in different scenarios through multi-channel switching. In some other embodiments, SW3 may include one or more capacitors/inductors/resistors to tune a current distribution and an electrical length of the antenna during operation through a simpler setting than the switch.

Figure 16:
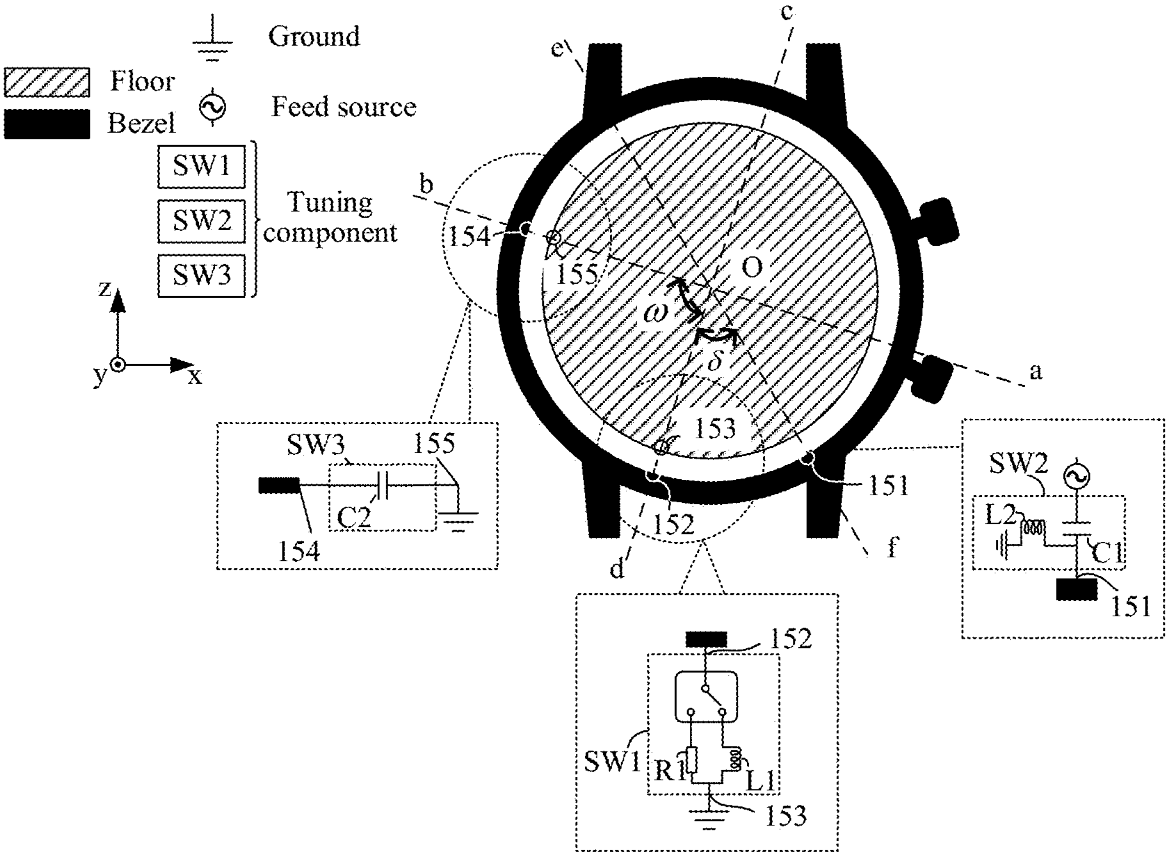
FIG. 16 is a schematic diagram of composition of an antenna according to an embodiment of this application.

As an example, the antenna is provided with $SW_1$, $SW_2$, and $SW_3$. FIG. 16 shows a specific implementation of the antenna shown in FIG. 15. In this example, specific settings of $SW_1$, $SW_2$, and $SW_3$ will be illustrated.

$SW_1$ is taken as an example. $SW_1$ may be provided between the ground point 152 on the radiator and the point 153 on the floor. In this example, $SW_1$ includes two paths. The two paths may be respectively provided with an inductor $L_1$ and a capacitor $R_1$. $SW_1$ may include three operating states, such as off, $L_1$ on, and $R_1$ on. In this way, with reference to FIG. 9, the control module 702 of the watch may control $SW_1$ to operate in different operating states through different control information. In this way, a relative relationship between corresponding resonances in different modes on the antenna is adjusted, so as to achieve an effect of controlling the antenna to provide corresponding polarization characteristics.

$SW_2$ is taken as an example. $SW_2$ may be provided between the feed point 151 and the feed source. In this example, $SW_2$ may include one or more impedance matching. Exemplarily, $SW_2$ includes a capacitor $C_1$ and a ground inductor $L_2$. For example, the ground inductor L2 and the capacitor $C_1$ are successively connected from the feed point 151 to the feed source. In this way, through the arrangement of $L_2$ and $C_1$, an effect of adjusting the port impedance of the antenna is achieved. In some other embodiments of this application, $SW_2$ may also be provided with a switch, different electronic components may be disposed on different switching paths, so as to achieve the effect of adjusting the port impedance of the antenna in different cases by switching to different paths.

$SW_3$ is taken as an example. $SW_3$ may be provided between the ground point 154 and the point 155 on the floor. In this example, $SW_3$ may include a capacitor $C_2$. Through the arrangement of $C_2$, an effect of adjusting an operating frequency of the antenna is achieved. As an example, the capacitor $C_2$ may be an element with lower impedance. For example, the capacitor $C_2$ may be set to high capacitance (e.g., capacitance greater than 1 pF). In some other embodiments of this application, $SW_3$ may also include an inductor or a resistor with lower impedance. For example, $SW_3$ may be set to low inductance (e.g., inductance less than 3 nH). In another example, $SW_3$ may be set to low resistance (e.g., zero ohms).

Based on the composition of the antenna shown in FIG. 15 and FIG. 16, and based on a circumference of the bezel, the antenna may be excited to operate in a corresponding mode. For example, an operating frequency band is GPS L1 (1575.42 MHz). When an electrical length of the circumference of the bezel is close to a wavelength corresponding to 1575.42 MHz, the antenna is enabled to operate in a $2/2\lambda$ mode (that is, a 1× wavelength mode) to cover the operating frequency band by adjusting $SW_1$ and/or $SW_2$ and/or $SW_3$ above.

It is to be noted that, since a plurality of ground points are provided in the antenna shown in FIG. 15 and FIG. 16, the 2/2 wavelength mode may correspond to different current distributions at the same time, thereby acquiring a plurality of resonances at the same time.

Figure 17:
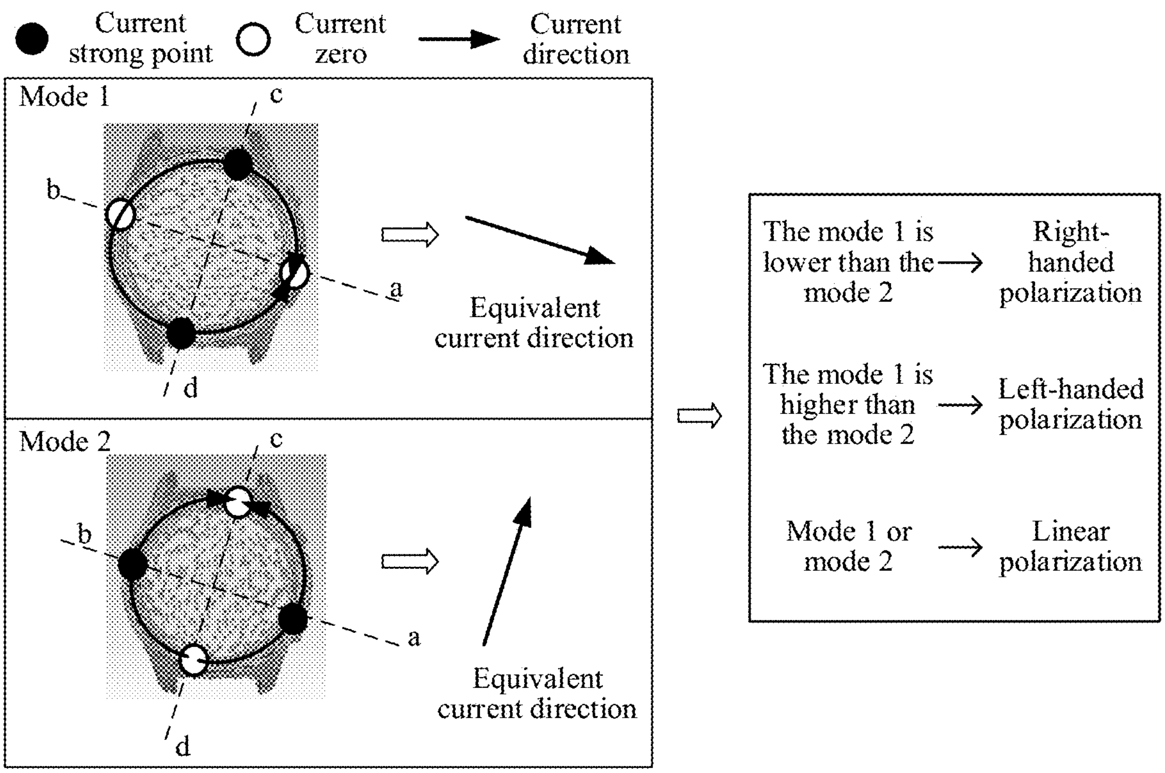
FIG. 17 is a schematic diagram of current simulation of an antenna according to an embodiment of this application.

For example, referring to FIG. 17, when the antenna operates, a mode 1 and a mode 2 may be excited simultaneously. Both the mode 1 and the mode 2 may be 2/2 wavelength modes. Different from different current ground locations, current distributions of the mode 1 and the mode 2 are different, so that coverage frequency bands of resulting resonances are also different. In this example, the mode 1 and the mode 2 may coexist, resonant frequency points are close, and the current distributions have a characteristic of being orthogonal (or nearly orthogonal). In some implementations, the mode 1 and the mode 2 may also correspond to degenerate modes.

In this example, with reference to the description in FIG. 15, since the two ground points differ 90 degrees or near 90 degrees from the geometric center of the watch face, equivalent current distributions corresponding to the mode 1 and the mode 2 have the characteristic of being orthogonal.

Exemplarily, as can be seen from the current simulation shown in FIG. 17, for the mode 1, two current zeros may be distributed near intersections between the straight line ab and the bezel. Two current strong points may be distributed near intersections between the straight line cd, which is orthogonal or nearly orthogonal to the straight line ab, and the bezel. Then, in the mode 1, equivalent current directions on the bezel may be distributed along the straight line ab. For example, in this example, an equivalent current flow direction in the mode 1 may be close to the horizontal direction.

For the mode 2, two current zeros may be distributed near intersections between the straight line cd and the bezel. Two current strong points may be distributed near intersections between the straight line ab, which is orthogonal or nearly orthogonal to the straight line cd, and the bezel. Then, in the mode 2, equivalent current directions on the bezel may be distributed along the straight line cd. For example, in this example, an equivalent current flow direction in the mode 2 may be close to the vertical direction.

Since the straight line ab and the straight line cd have an orthogonal or nearly orthogonal relationship, the equivalent current distributions corresponding to the mode 1 and the mode 2 have an orthogonal or nearly orthogonal relationship.

As is well known in the art, for two orthogonal dipole antennas, when the two antennas have same amplitude and different phases, a circular polarization characteristic may be generated. With reference to the mode 1 and the mode 2 shown in FIG. 17, feed signals are the same, so the two modes have same amplitude. The different phases may be manifested in different frequency band coverages. Then, through adjustment of a contextual relationship between respective resonances of the mode 1 and the mode 2 in frequency, the mode 1 and the mode 2 can operate together to provide a left-handed circular polarization or right-handed circular polarization characteristic.

Exemplarily, when the frequency corresponding to the resonance in the mode 1 is lower than the frequency corresponding to the resonance in the mode 2, the antenna may correspond to the right-handed circular polarization characteristic. When the frequency corresponding to the resonance in the mode 1 is higher than the frequency corresponding to the resonance in the mode 2, the antenna may correspond to the left-handed circular polarization characteristic. In addition, when only one mode covers the operating frequency band, the antenna can provide a linear polarization characteristic.

Operating conditions of the antenna in different operating states are described in detail below with reference to the example of SW1 shown in FIG. 16.

Figure 18A:
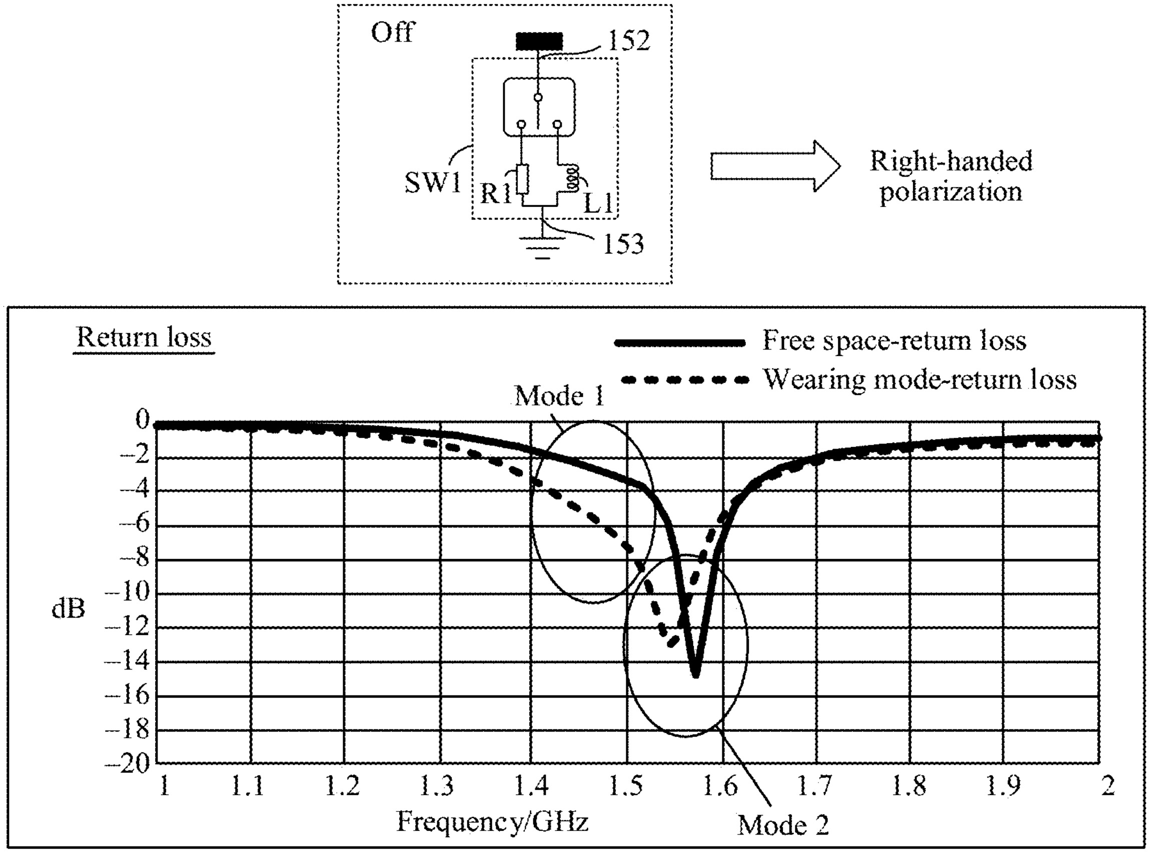
FIG. 18A and FIG. 18B are schematic diagrams of S-parameter simulation of an antenna according to an embodiment of this application.

Referring to FIG. 18A, $SW_1$ may be in an off state. The mode 1 and the mode 2 jointly cover the operating frequency band as shown in return loss simulation. In addition, if the resonance corresponding to the mode 1 is lower than the resonance corresponding to the mode 2, the antenna may have the right-handed circular polarization characteristic. With reference to the example in the solution shown in FIG. 12, the control information 122 may be used for controlling $SW_1$ to operate in the off sate. In this way, the antenna module 703 may be controlled to operate in the operating state 123, which corresponds to the right-handed circular polarization characteristic as provided in FIG. 18A.

The solution provided in this embodiment of this application may have better radiation performance while providing the corresponding polarization characteristic. It may be understood that the watch is worn on the wrist of the user in most usage scenarios. Therefore, in this example, for a more accurate description, radiation efficiency simulation and system efficiency simulation provided in this application show both antenna efficiency in a free space and antenna efficiency in a wearing mode. The wearing mode may correspond to a case where the watch is worn on a standard forearm model. The standard forearm model may be a forearm model published by the Cellular Telecommunications Industry Association (Cellular Telecommunications Industry Association, CTIA).

Figure 18B:
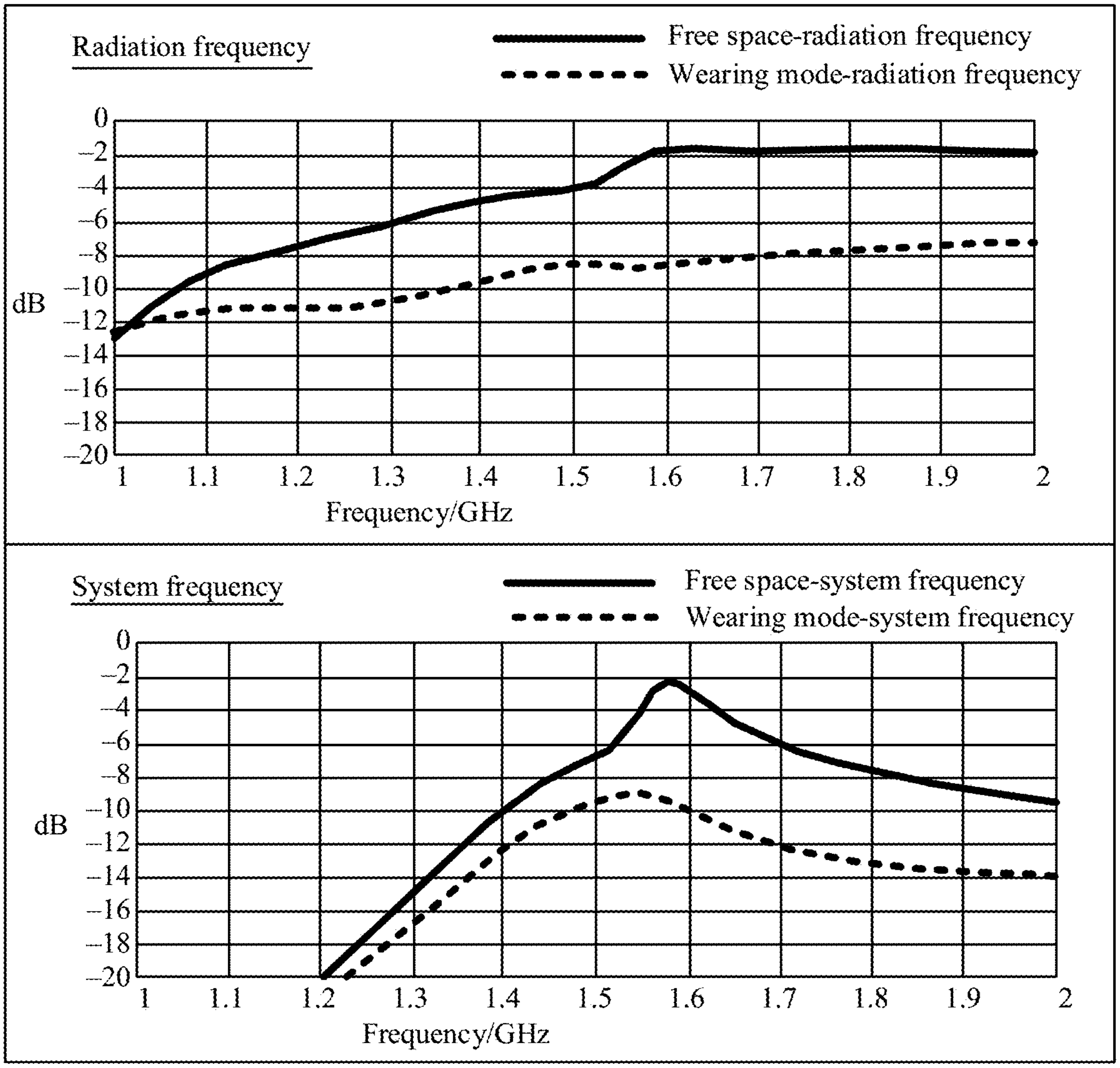

The radiation efficiency simulation shown in FIG. 18B shows that, in the operating frequency band (such as GPS L1), the radiation efficiency in the free space is higher than −4 dB, and the radiation efficiency in the wearing mode is also higher than −9 dB and close to −8 dB. The system efficiency simulation shown in FIG. 18B shows that, in the operating frequency band, the system efficiency in the free space is higher than −4 dB, and the system efficiency in the wearing mode is also close to −8 dB. Therefore, it can be proved that the antenna solution provided in this embodiment of this application can provide better radiation performance while providing the right-handed circular polarization characteristic.

In this way, when the watch face of the watch points to the sky, the antenna on the watch can be controlled to operate in the state as shown in FIG. 18A and FIG. 18B, so that the watch can better receive the positioning signals from the sky and achieve accurate positioning.

Figure 19A:
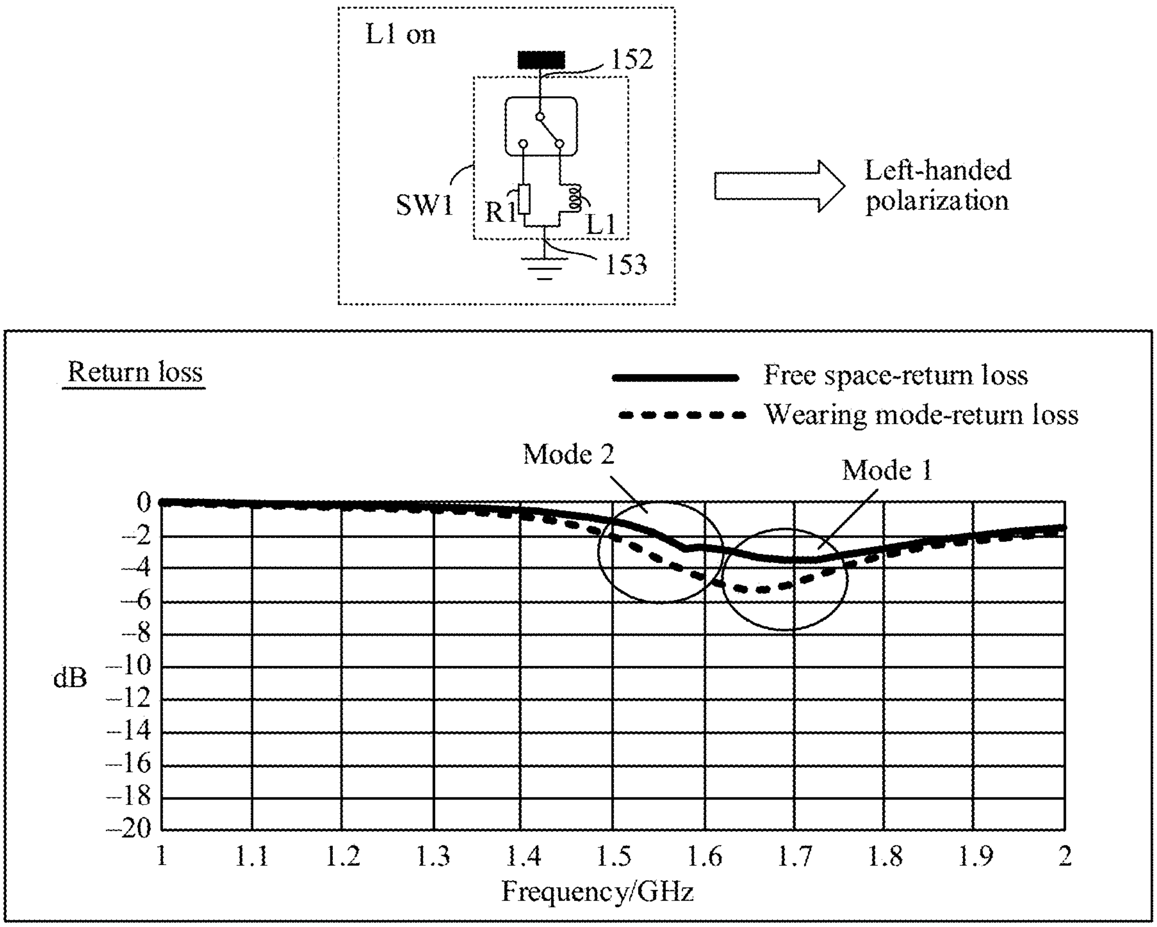
FIG. 19A and FIG. 19B are schematic diagrams of S-parameter simulation of an antenna according to an embodiment of this application.

Referring to FIG. 19A, SW1 may be in an L1 on state. The mode 1 and the mode 2 jointly cover the operating frequency band as shown in return loss simulation. In addition, if the resonance corresponding to the mode 1 is higher than the resonance corresponding to the mode 2, the antenna may have the left-handed circular polarization characteristic. Then, the state may correspond to the wearing state corresponding to the state 4 shown in FIG. 5.

Figure 19B:
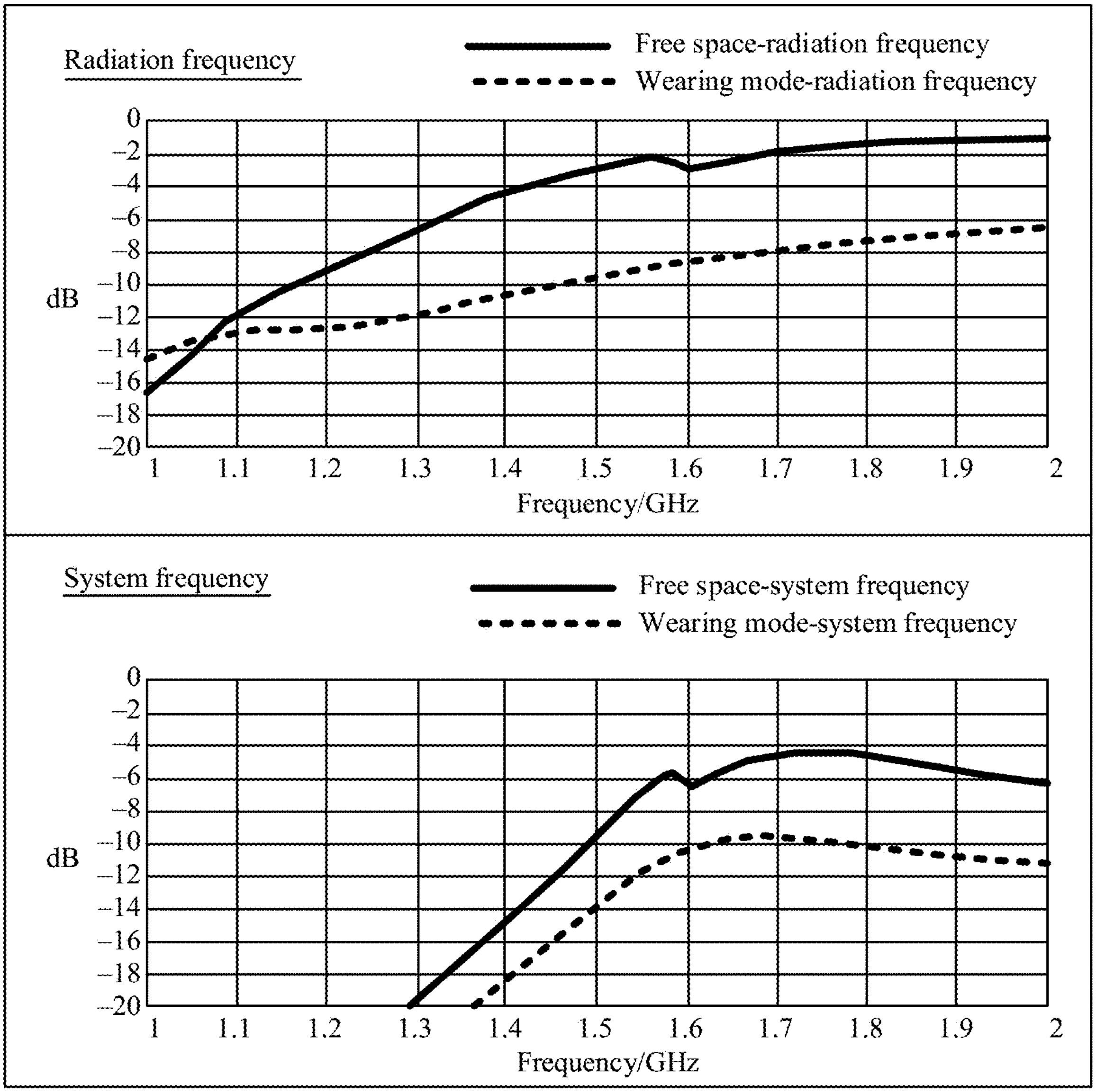

The radiation efficiency simulation shown in FIG. 19B shows that, in the operating frequency band (such as GPS L1), the radiation efficiency in the free space is higher than −4 dB, and the radiation efficiency in the wearing mode is also higher than −10 dB. The system efficiency simulation shown in FIG. 19B shows that, in the operating frequency band, the system efficiency in the free space is higher than −6 dB, and the system efficiency in the wearing mode is also close to −12 dB. Therefore, it can be proved that the antenna solution provided in this embodiment of this application can provide better radiation performance while providing the left-handed circular polarization characteristic.

In this way, when the watch face of the watch points to the ground, the antenna on the watch can be controlled to operate in the state as shown in FIG. 19A and FIG. 19B, so that the watch can better receive the positioning signals from the sky and achieve accurate positioning.

Figure 20A:
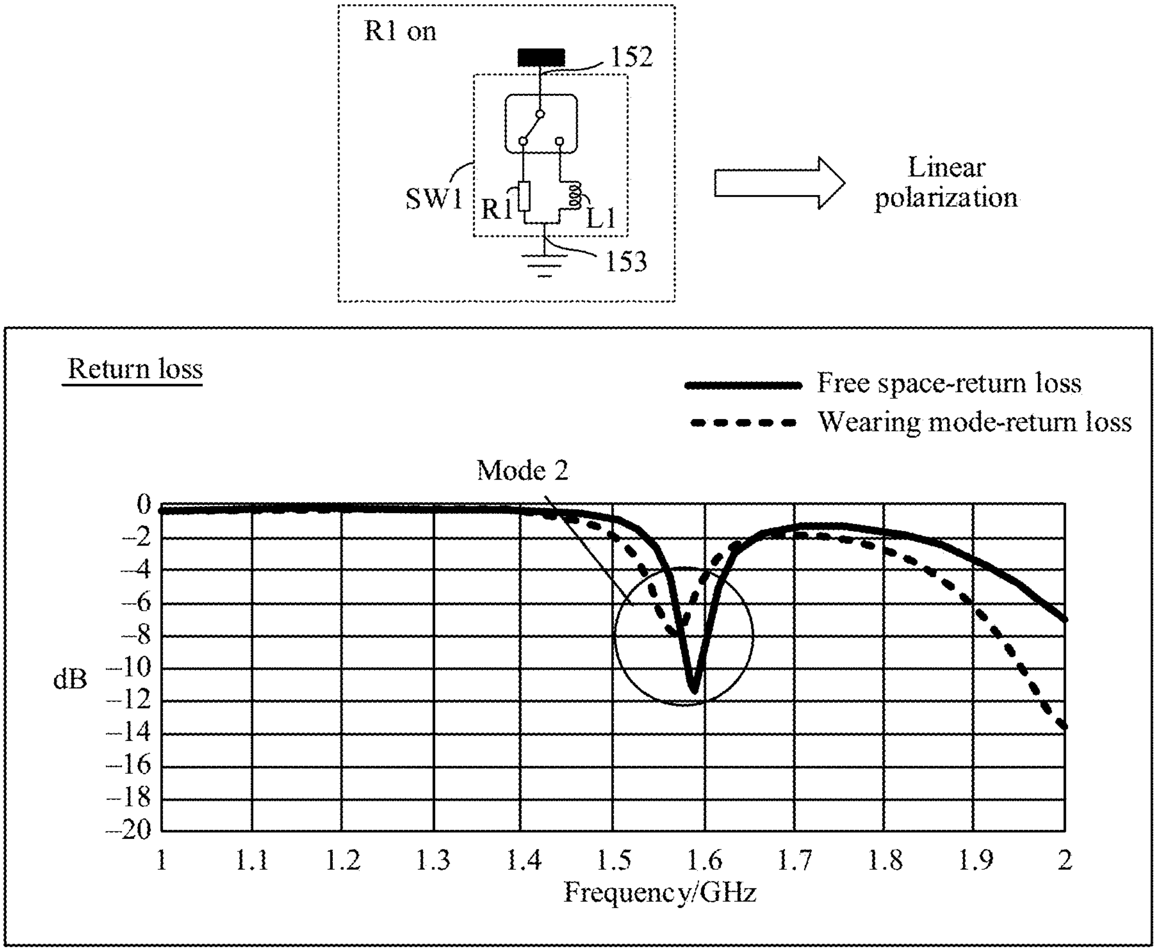
FIG. 20A and FIG. 20B are schematic diagrams of S-parameter simulation of an antenna according to an embodiment of this application.

Referring to FIG. 20A, $SW_1$ may be in an $R_1$ on state. The mode 2 is used for covering the operating frequency band as shown in return loss simulation. Then, in this case, the antenna may have the linear polarization characteristic. Then, the state may correspond to the wearing state corresponding to the state 2 or the state 3 as shown in FIG. 5. With reference to the example in FIG. 13, the control module 702 of the watch may control SW1 to operate in the $R_1$ on state through the control information 132, so that the antenna module 703 can operate in the $R_1$ on state and provide the linear polarization characteristic.

Figure 20B:
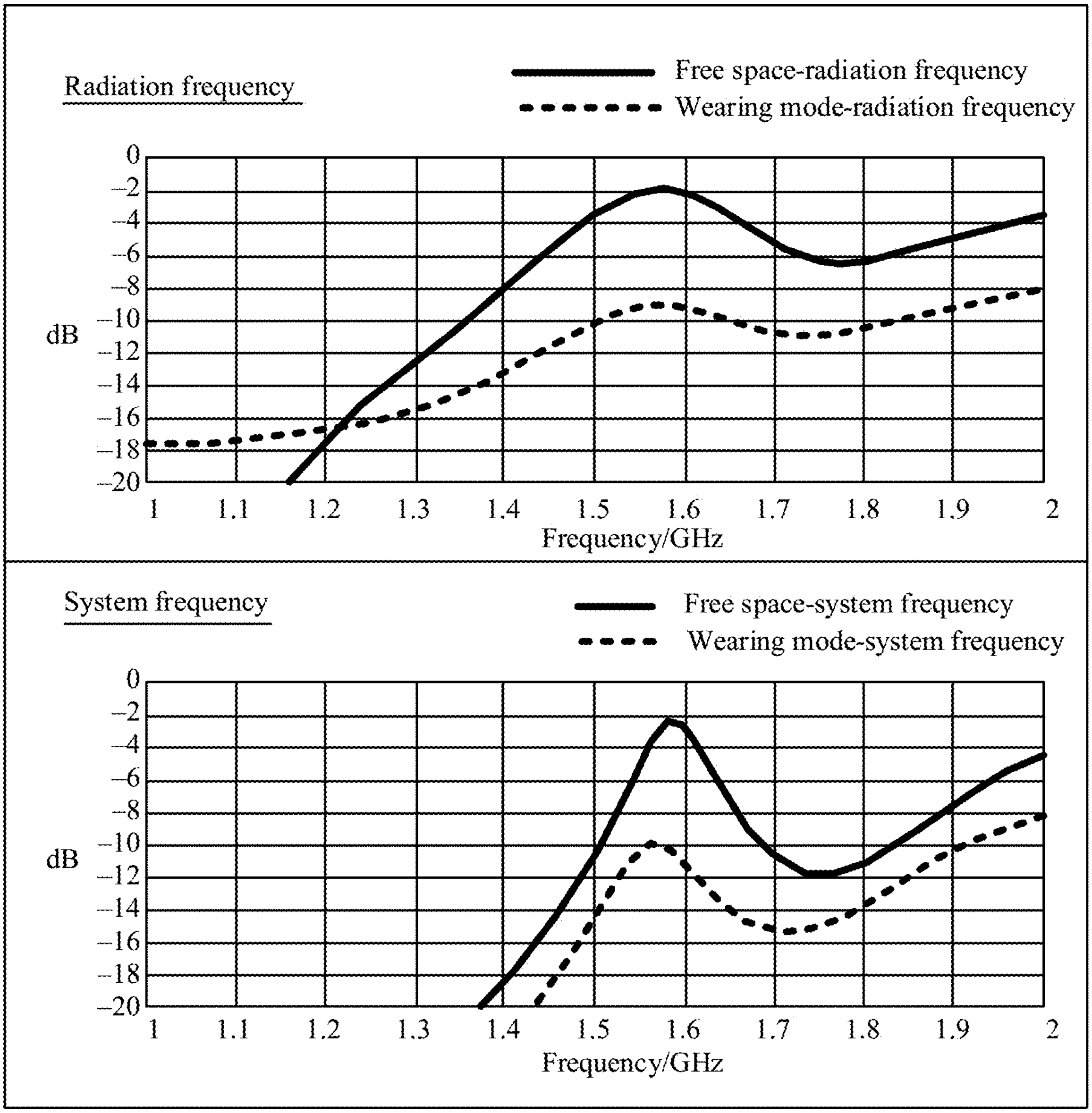

The radiation efficiency simulation shown in FIG. 20B shows that, in the operating frequency band (such as GPS L1), the radiation efficiency in the free space is higher than −2 dB, and the radiation efficiency in the wearing mode is also higher than −10 dB. The system efficiency simulation shown in FIG. 20B shows that, in the operating frequency band, the system efficiency in the free space is higher than −4 dB, and the system efficiency in the wearing mode is also higher than −10 dB. Therefore, it can be proved that the antenna solution provided in this embodiment of this application can provide better radiation performance while providing the linear polarization characteristic.

In this way, when the direction the watch face of the watch points to is parallel to the ground, the antenna on the watch can be controlled to operate in the state as shown in FIG. 20A and FIG. 20B, so that the watch can better receive the positioning signals from the sky and achieve accurate positioning.

Based on the description in FIG. 15 to FIG. 20A and FIG. 20B above, a person skilled in the art should be able to understand specific implementations of the antenna that can provide a plurality of different polarization characteristics, which are provided in this embodiment of this application, and the effects that can be achieved.

It is to be noted that, the antenna shown in FIG. 15 to FIG. 20A and FIG. 20B is only an example. Based on the idea of controlling the antenna to provide different polarization characteristics in different attitudes provided in this application, the antenna may alternatively be another antenna solution that can provide at least two different polarization characteristics.

Figure 21:
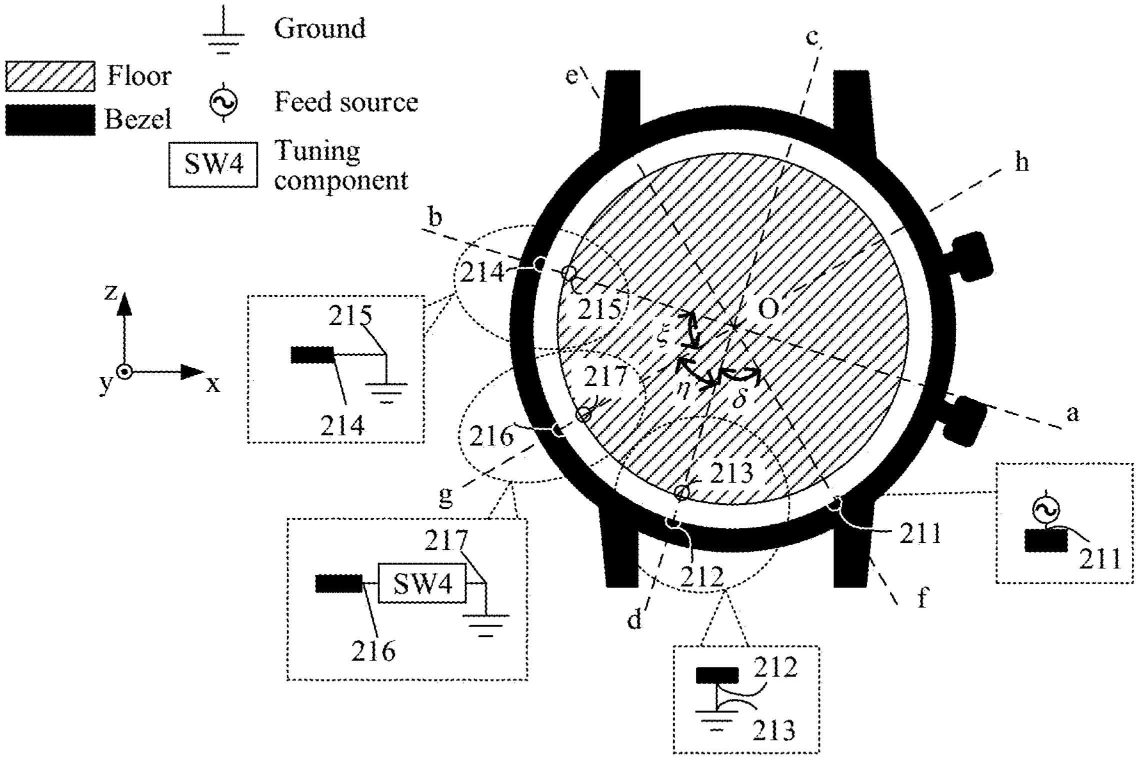
FIG. 21 is a schematic diagram of composition of an antenna according to an embodiment of this application.

Exemplarily, FIG. 21 illustrates a solution of another antenna according to an embodiment of this application. The antenna may alternatively provide different polarization characteristics when a tuning module operates in different states, which provides support for implementation of the solutions shown in FIG. 6 to FIG. 14 in this application.

As shown in FIG. 21, in this example, a feed point 211 may be provided on the antenna. A line connecting the feed point 211 and the geometric center O of the watch face may be a straight line ef. Taking the straight line ef as a reference, a straight line cd can be obtained by rotating δ degrees counterclockwise. δ may be included in a range of 45+/−15 degrees.

In intersections between the straight line cd and the bezel, the intersection close to the feed point 211 may be a ground point 212. The ground point 212 may be connected to a point 213 on the floor nearby.

Taking the straight line cd as a reference, a straight line gh can be obtained by rotating η degrees counterclockwise. η may also be included in the range of 45+/−15 degrees.

In intersections between the straight line gh and the bezel, the intersection close to the ground point 212 may be a ground point 216. The ground point 216 may be connected to a point 217 on the floor nearby. In this example, a tuning component $SW_4$ may be provided between the ground point 216 and the point 217. The arrangement of $SW_4$ may be obtained with reference to $SW_1$ in the foregoing example. The antenna in this example can provide different polarization characteristics by adjusting $SW_4$ to operate in different states.

Taking the straight line gh as a reference, a straight line ab can be obtained by rotating ξ degrees counterclockwise. ξ may also be included in the range of 45+/−15 degrees.

In intersections between the straight line ab and the bezel, the intersection close to the ground point 216 may be a ground point 214. The ground point 214 may be connected to a point 215 on the floor nearby.

It is to be noted that, in this embodiment of this application, a corresponding tuning component may also be provided on a link where any electrical connection point is located, so as to realize adjustment of electrical parameters such as port impedance and an electrical length of the antenna.

With reference to the description in FIG. 21 and FIG. 16, in the embodiments of this application, two examples are given for the implementation of the antenna capable of providing different polarization characteristics. In some other embodiments of this application, the antenna may also have other different implementation forms. For example, based on the antenna solution shown in FIG. 21, positions of the feed point 211, the ground point 212, the ground point 216, and the ground point 214 may also be different in pairs, such as interchangeable, or disposed at other positions on the bezel. The specific structure of the antenna is not limited in the embodiments of this application.

It is to be understood that the antenna is applicable to the antenna switching solution provided in this application and matching the attitude, provided that the antenna can provide different polarization characteristics through switching.

It is to be understood that, although this application is described with reference to specific features and the embodiments thereof, apparently, various modifications and combinations may be made without departing from the spirit and scope of this application. Correspondingly, this specification and the accompanying drawings are merely exemplary descriptions of this application defined by the appended claims, and are considered as having covered any of and all of the modifications, variations, combinations, or equivalents within the scope of this application. Obviously, a person skilled in the art can make various modifications and variations to this application without departing from the spirit and scope of this application. In this case, if the modifications and variations made to this application fall within the scope of the claims of this application and equivalent technologies thereof, this application is also intended to include these modifications and variations.

What is claimed is:

1. A method, applied to an electronic device, wherein directions a display screen points to in different attitudes comprise a first direction and a second direction when the electronic device is in use; the electronic device corresponds to a first attitude when the display screen points to the first direction, and the electronic device corresponds to a second attitude when the display screen points to the second direction, the electronic device comprises a terminal antenna comprising a first ground point, the first ground point is connected to a first end of a tuning component of the terminal antenna, and an second end of the tuning component is connected to a reference ground, the tuning component comprises a first path and a second path, matching components configured in the first path and the second path are different, and the method comprises:

- controlling the first path to be in an on state when an attitude of the electronic device is the first attitude, to cause a polarization characteristic of the terminal antenna to be a first polarization characteristic;
- controlling the second path to be in an on state when an attitude of the electronic device is the second attitude, to cause the polarization characteristic of the terminal antenna to be a second polarization characteristic; and
- wherein the first attitude is different from the second attitude, and the first polarization characteristic is different from the second polarization characteristic.

2. The method according to claim 1, wherein controlling the first path to be in the on state when the attitude of the electronic device is the first attitude comprises:

- controlling the first path to be in on the state, causing the terminal antenna to operate in a first state, wherein the terminal antenna in the first state has the first polarization characteristic; and
- wherein the controlling the second path to be in the on state when the attitude of the electronic device is the second attitude comprises:
  - controlling the second path to be in the on state, causing the terminal antenna to operate in a second state, wherein the terminal antenna in the second state has the second polarization characteristic.

3. The method according to claim 2, wherein before controlling the first path to be in the on state, causing the terminal antenna to operate in the first state, the method comprises:

- determining first control information corresponding to the first attitude, wherein the first control information is used for controlling the terminal antenna to operate in the first state.

4. The method according to claim 3, wherein an attitude-polarization truth table is stored in the electronic device, wherein the attitude-polarization truth table comprises control information corresponding to different attitudes, and the first control information corresponds to the first attitude in the attitude-polarization truth table; and

- wherein determining the first control information corresponding to the first attitude comprises:
  - querying, according to the first attitude, the attitude-polarization truth table to acquire the corresponding first control information.

5. The method according to claim 2, wherein after controlling the first path to be in the on state, the method comprises:

- determining whether a signal strength of a signal received by the terminal antenna is greater than a preset threshold, and controlling, when it is determined that the signal strength is greater than the preset threshold, the terminal antenna to continue to operate in the first state to receive the signal.

6. The method according to claim 5, comprising:

when it is determined that the signal strength is less than the preset threshold, controlling the terminal antenna to operate in a fourth state; and determining whether a signal strength of the signal received by the terminal antenna is greater than the preset threshold, and controlling, when it is determined that the signal strength is greater than the preset threshold, the terminal antenna to continue to operate in the fourth state to receive the signal.

7. The method according to claim 6, further comprising:

when signal strengths of corresponding signals respectively received by the terminal antenna switched to different operating states are less than the preset threshold, controlling the terminal antenna to operate in a fifth state to receive a signal, a signal strength of the signal received in the fifth state being greater than the signal strengths of the signals received in other operating states.

8. The method according to claim 1, wherein the electronic device comprises an attitude input sensor, and the method further comprises:

acquiring, by the electronic device, attitude information through the attitude input sensor; and determining the attitude of the electronic device as the first attitude or the second attitude according to the attitude information.

9. The method according to claim 8, wherein the attitude input sensor comprises an acceleration sensor or a gyroscope sensor;

the attitude information comprises a current angular velocity of the electronic device when the attitude input sensor comprises the acceleration sensor; and the attitude information comprises current displacement of the electronic device in each axial direction when the attitude input sensor comprises the gyroscope sensor.

10. The method according to claim 1, wherein the first direction is a direction pointing towards the sky, and the first polarization characteristic is a right-handed circular polarization characteristic or a right-handed elliptical polarization characteristic.

11. The method according to claim 1, wherein the second direction is a direction pointing towards a horizontal plane, and the second polarization characteristic is a linear polarization characteristic.

12. The method according to claim 1, further comprising:

when the terminal antenna operates in a first state, receiving, by the terminal antenna, a positioning signal, wherein the terminal antenna in the first state has the first polarization characteristic; and controlling, by the electronic device, the terminal antenna to operate in a second state when a received signal strength of the positioning signal is less than a preset threshold, wherein the terminal antenna in the second state has the second polarization characteristic.

13. The method according to claim 12, wherein the received signal strength of the positioning signal received by the terminal antenna is greater than the preset threshold when the terminal antenna operates in the second state.

14. The method according to claim 1, wherein the first direction is a direction pointing towards the sky, and the first polarization characteristic is a right-handed circular polarization characteristic or a right-handed elliptical polarization characteristic; and wherein the second direction is a direction pointing towards a horizontal plane, and the second polarization characteristic is a linear polarization characteristic.

15. An electronic device, comprising a terminal antenna, the terminal antenna comprising:

a first radiator, wherein a structure of the first radiator is a closed ring structure;

wherein the first radiator comprises at least three electrical connection points, the at least three electrical connection points comprise a feed point and at least two ground points;

wherein an operating state of the terminal antenna comprises a first state and a second state, the terminal antenna in the first state has a first polarization characteristic, and the terminal antenna in the second state has a second polarization characteristic;

wherein the at least two ground points comprise a first ground point, the first ground point is connected to a first end of a tuning component of the terminal antenna, a second end of the tuning component is connected to a reference ground, the tuning component comprises a first path and a second path, and the tuning component is configured to control the terminal antenna to operate in the first state or the second state according to the following:

the tuning component is configured to control the first path to be in an on state when an attitude of the electronic device is a first attitude, to cause a polarization characteristic of the terminal antenna to be the first polarization characteristic; and the tuning component is configured to control the second path to be in an on state when an attitude of the electronic device is a second attitude, to cause the polarization characteristic of the terminal antenna to be the second polarization characteristic; and wherein the first attitude is different from the second attitude, and the first polarization characteristic is different from the second polarization characteristic.

16. The electronic device according to claim 15, wherein:

the at least three electrical connection points further comprise a first electrical connection point, a second electrical connection point, and a third electrical connection point, an angle between the first electrical connection point and the second electrical connection point relative to a geometric center of the first radiator is within a range of 45+/−15 degrees; and an angle between the second electrical connection point and the third electrical connection point relative to the geometric center of the first radiator is within a range of 90+/−15 degrees.

17. The electronic device according to claim 15, wherein a first resonance and a second resonance are excited when the terminal antenna operates, and an equivalent current direction corresponding to the first resonance on the first radiator is perpendicular to an equivalent current direction corresponding to the second resonance on the first radiator; and wherein the equivalent current direction corresponding to the first resonance is towards a horizontal direction, and the equivalent current direction corresponding to the second resonance is towards a vertical direction.

18. The electronic device according to claim 17, wherein when the operating state of the terminal antenna is the first state, the first resonance and the second resonance jointly cover an operating frequency band of the terminal antenna, and the first resonance is lower than the second resonance; and when the operating state of the terminal antenna is the second state, the first resonance and the second resonance jointly cover the operating frequency band of the terminal antenna, and the first resonance is higher than the second resonance.

19. The electronic device according to claim 15, wherein:

in the first state, the terminal antenna has a right-handed circular polarization or right-handed elliptical polarization characteristic; and in the second state, the terminal antenna has a left-handed circular polarization or left-handed elliptical polarization characteristic.

* * * * *